US010645316B2

(12) United States Patent
Shigiya et al.

(10) Patent No.: US 10,645,316 B2
(45) Date of Patent: May 5, 2020

(54) IMAGING DEVICE AND METHOD OF DRIVING IMAGING DEVICE

(71) Applicant: CANON KABUSHIKI KAISHA, Tokyo (JP)

(72) Inventors: Yoshiko Shigiya, Tokyo (JP); Shintaro Takenaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/213,277

(22) Filed: Dec. 7, 2018

(65) Prior Publication Data
US 2019/0191112 A1 Jun. 20, 2019

(30) Foreign Application Priority Data

Dec. 15, 2017 (JP) ................. 2017-240694

(51) Int. Cl.
H04N 5/357 (2011.01)
H04N 5/374 (2011.01)
(Continued)

(52) U.S. Cl.
CPC ........... *H04N 5/357* (2013.01); *H04N 5/3454* (2013.01); *H04N 5/3532* (2013.01);
(Continued)

(58) Field of Classification Search
CPC ...... H04N 5/374; H04N 5/357; H04N 5/3574; H04N 5/3535; H04N 5/35554; H04N 5/36963; H04N 5/37452; H04M 5/3532
(Continued)

(56) References Cited

U.S. PATENT DOCUMENTS 6,900,837 B2 * 5/2005 Muramatsu ............ H04N 5/361
348/245
7,999,866 B2 8/2011 Sonoda
(Continued)

FOREIGN PATENT DOCUMENTS

JP 2005-109370 4/2005
JP 2009-5329 1/2009
(Continued)

OTHER PUBLICATIONS

European Search Report dated Mar. 25, 2019 during prosecution of related European application No. 18212181.4.
(Continued)

*Primary Examiner* — Marly S Camargo
(74) *Attorney, Agent, or Firm* — Venable LLP

(57) ABSTRACT

An embodiment includes: a pixel unit including first and second imaging regions arranged with effective pixels and first and second reference regions arranged with optical black pixels; and a scanning unit that performs, on a row-by-row basis, reset operations of photoelectric converters and readout operations of pixel signals based on charges generated in the photoelectric converters which includes charge transfer to transfer charges generated in the photoelectric converters to holding portions. The scanning unit drives the pixels in the first imaging region and the first reference region in a first condition where a period from the end of reset operation to the end of charge transfer is a first length and drives the pixels in the second imaging region and the second reference region in a second condition where a period from the end of reset operation to the end of charge transfer is a second length.

24 Claims, 16 Drawing Sheets

(51) Int. Cl.
  *H04N 5/376* (2011.01)
  *H04N 5/378* (2011.01)
  *H04N 5/353* (2011.01)
  *H04N 5/355* (2011.01)
  *H04N 5/345* (2011.01)
  *H04N 5/369* (2011.01)
  *H04N 5/3745* (2011.01)

(52) U.S. Cl.
  CPC ....... *H04N 5/3535* (2013.01); *H04N 5/35554* (2013.01); *H04N 5/36963* (2018.08); *H04N 5/378* (2013.01); *H04N 5/3765* (2013.01); *H04N 5/37452* (2013.01)

(58) Field of Classification Search
  USPC ....... 348/241, 243, 245, 259, 300, 296, 367, 348/308, 294; 257/291, 292, 257, 297; 250/208.1
  See application file for complete search history.

(56) References Cited

U.S. PATENT DOCUMENTS

| | | | |
|---|---|---|---|
| 8,049,799 | B2 | 11/2011 | Sonoda |
| 8,081,246 | B2 | 12/2011 | Takenaka |
| 8,305,473 | B2 | 11/2012 | Takenaka |
| 8,363,137 | B2 | 1/2013 | Sonoda |
| 8,466,994 | B2 | 6/2013 | Takenaka |
| 8,670,058 | B2 | 3/2014 | Hayashi |
| 9,111,825 | B2 | 8/2015 | Kai |
| 9,654,697 | B2 | 5/2017 | Takenaka |
| 9,780,139 | B2 | 10/2017 | Tayanaka |
| 9,843,752 | B2 | 12/2017 | Yamamoto |
| 9,942,493 | B2 | 4/2018 | Ishii |
| 10,277,855 | B2 * | 4/2019 | Ishii ................ H04N 5/378 348/308 |
| 10,535,688 | B2 * | 1/2020 | Onuki ............ H01L 27/14643 348/294 |
| 2006/0181625 | A1 * | 8/2006 | Han .................. H04N 5/335 348/308 |
| 2007/0273785 | A1 | 11/2007 | Ogawa |
| 2008/0054320 | A1 * | 3/2008 | Solhusvik ........... H04N 5/3575 348/243 |
| 2009/0180014 | A1 * | 7/2009 | Noda .................. H04N 5/335 348/294 |
| 2010/0007780 | A1 | 1/2010 | Nishihara |
| 2010/0085451 | A1 * | 4/2010 | Suwa ..................... H04N 9/64 348/248 |
| 2010/0085458 | A1 * | 4/2010 | Horiguchi ........... H04N 5/3454 348/294 |
| 2010/0134667 | A1 * | 6/2010 | Suzuki ................ H04N 5/3572 348/294 |
| 2011/0267513 | A1 | 11/2011 | Sonoda |
| 2012/0013778 | A1 | 1/2012 | Sonoda |
| 2013/0021497 | A1 * | 1/2013 | Kawamura ........... H04N 5/361 348/231.3 |
| 2015/0129744 | A1 | 5/2015 | Sonoda |
| 2016/0219232 | A1 | 7/2016 | Murata |
| 2016/0276396 | A1 | 9/2016 | Hiroshi |
| 2016/0344962 | A1 * | 11/2016 | Hirai ................... H04N 5/378 348/297 |
| 2017/0187944 | A1 | 6/2017 | Takenaka |
| 2017/0214867 | A1 | 7/2017 | Hirokazu |
| 2017/0237912 | A1 | 8/2017 | Takenaka |
| 2018/0316881 | A1 * | 11/2018 | Arishima ............ H04N 5/658 348/300 |
| 2019/0252432 | A1 * | 8/2019 | Onuki ............... H04N 5/37455 348/294 |

FOREIGN PATENT DOCUMENTS

| | | |
|---|---|---|
| JP | 2010-21697 | 1/2010 |
| JP | 2012-120076 | 6/2012 |
| JP | 2013-55387 | 3/2013 |
| JP | 2013-172204 | 9/2013 |
| JP | 2015-133469 | 7/2015 |
| JP | 2017-130834 | 7/2017 |

OTHER PUBLICATIONS

Japanese Office Action dated Nov. 21, 2019 during prosecution of related Japanese application No. 2017-240694. (English-language machine translation included.).

* cited by examiner

IMAGING DEVICE AND METHOD OF DRIVING IMAGING DEVICE

BACKGROUND OF THE INVENTION

Field of the Invention

The present invention relates to an imaging device and a method of driving the imaging device.

Description of the Related Art

In an imaging device, an offset component due to heat or circuit structure is reduced by subtracting, from output values of pixels arranged in an effective pixel region formed of pixel groups irradiated with light, output values of pixels arranged in an optical black region formed of a pixel group shielded from light. The optical black region is typically arranged in the periphery of the effective pixel region. However, it is known that a difference in offset or noise superimposed on the output of pixels arranged in the optical black region is larger in pixels arranged in a position distant from the optical black region.

Japanese Patent Application Laid-Open No. 2013-055387 discloses an imaging device in which, when the imaging device is used for light amount measurement, an effective pixel region near a light amount measurement region is a light-shielded region, and the amount of offset or noise is calculated from output values of pixels arranged in the light-shielded region. Such a configuration allows for a shorter physical distance between the light amount measurement region and a region in which pixels used for calculating the amount of offset or noise are arranged and improves the accuracy of offset correction.

An offset value superimposed on a pixel signal varies in accordance with a change in the exposure time of the pixel. Therefore, in order to perform appropriate offset correction of a pixel signal, it is desirable that the exposure time of pixels arranged in an optical black (OB) region be the same as the exposure time of pixels arranged in an effective pixel region.

In the imaging device disclosed in Japanese Patent Application Laid-Open No. 2013-055387, however, there is no consideration for a case where the exposure time is different among a plurality of imaging regions. Thus, when there are a plurality of imaging regions having different exposure time, it is not always possible to perform appropriate offset correction.

SUMMARY OF THE INVENTION

The present invention intends to provide an imaging device and a method of driving the imaging device that can perform appropriate offset correction even when the exposure time is different among a plurality of imaging regions.

According to one aspect of the present invention, there is provided an imaging device including a pixel unit including a plurality of pixels arranged over a plurality of rows, wherein each of the plurality of pixels includes a photoelectric converter, a holding portion that holds charges generated in the photoelectric converter, an amplifier unit that outputs a pixel signal based on an amount of charges held in the holding portion, and a reset unit that resets the photoelectric converter, and a scanning unit that performs a reset operation of the photoelectric converter of each of the pixels and a readout operation of a pixel signal based on charges generated in the photoelectric converter over the plurality of pixels on the row-by-row basis, the readout operation including charge transfer to transfer charges generated in the photoelectric converter to the holding portion, wherein the plurality of pixels include effective pixels in each of which a light enters the photoelectric converter and optical black pixels in each of which the photoelectric converter is shielded from light, the optical black pixels are arranged on a different row than a row on which the effective pixels are arranged, and the number of the optical black pixels on the different row is greater than the number of the effective pixel on the different row, wherein the pixel unit includes first and second imaging regions in which a plurality of the effective pixels are arranged, respectively, and first and second reference regions in which a plurality of the optical black pixels are arranged, respectively, wherein the scanning unit is configured to drive the pixels arranged in the first imaging region and the first reference region in a first condition where a period from a timing when the reset operation ends to a timing when the charge transfer ends is a first length, and drive the pixels arranged in the second imaging region and the second reference region in a second condition where a period from a timing when the reset operation ends to a timing when the charge transfer ends is a second length that is longer than the first length.

According to another aspect of the present invention, there is provided a method of driving an imaging device including a pixel unit provided with a plurality of pixels arranged over a plurality of rows, wherein each of the plurality of pixels includes a photoelectric converter, a holding portion that holds charges generated in the photoelectric converter, an amplifier unit that outputs a pixel signal based on an amount of charges held in the holding portion, and a reset unit that resets the photoelectric converter, wherein the plurality of pixels include effective pixels in each of which a light enters the photoelectric converter and optical black pixels in each of which the photoelectric converter is shielded from light, the optical black pixels are arranged on a different row than a row on which the effective pixels are arranged, and the number of the optical black pixels on the different row is greater than the number of the effective pixel on the different row, and wherein the pixel unit includes first and second imaging regions in which a plurality of the effective pixels are arranged, respectively, and first and second reference regions in which a plurality of the optical black pixels are arranged, respectively, the method including when performing a reset operation of the photoelectric converter of each of the pixels and a readout operation of a pixel signal based on charges generated in the photoelectric converter over the plurality of pixels on the row-by-row basis, wherein readout operation includes charge transfer to transfer charges generated in the photoelectric converter to the holding portion, driving the pixels arranged in the first imaging region and the first reference region in a first condition where a period from a timing when the reset operation ends to a timing when the charge transfer ends is a first length, and driving the pixels arranged in the second imaging region and the second reference region in a second condition where a period from a timing when the reset operation ends to a timing when the charge transfer ends is a second length that is longer than the first length.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

An imaging device and a method of driving the same according to a first embodiment of the present invention will be described with reference to FIG. 1 to FIG. 6.

Figure 1:
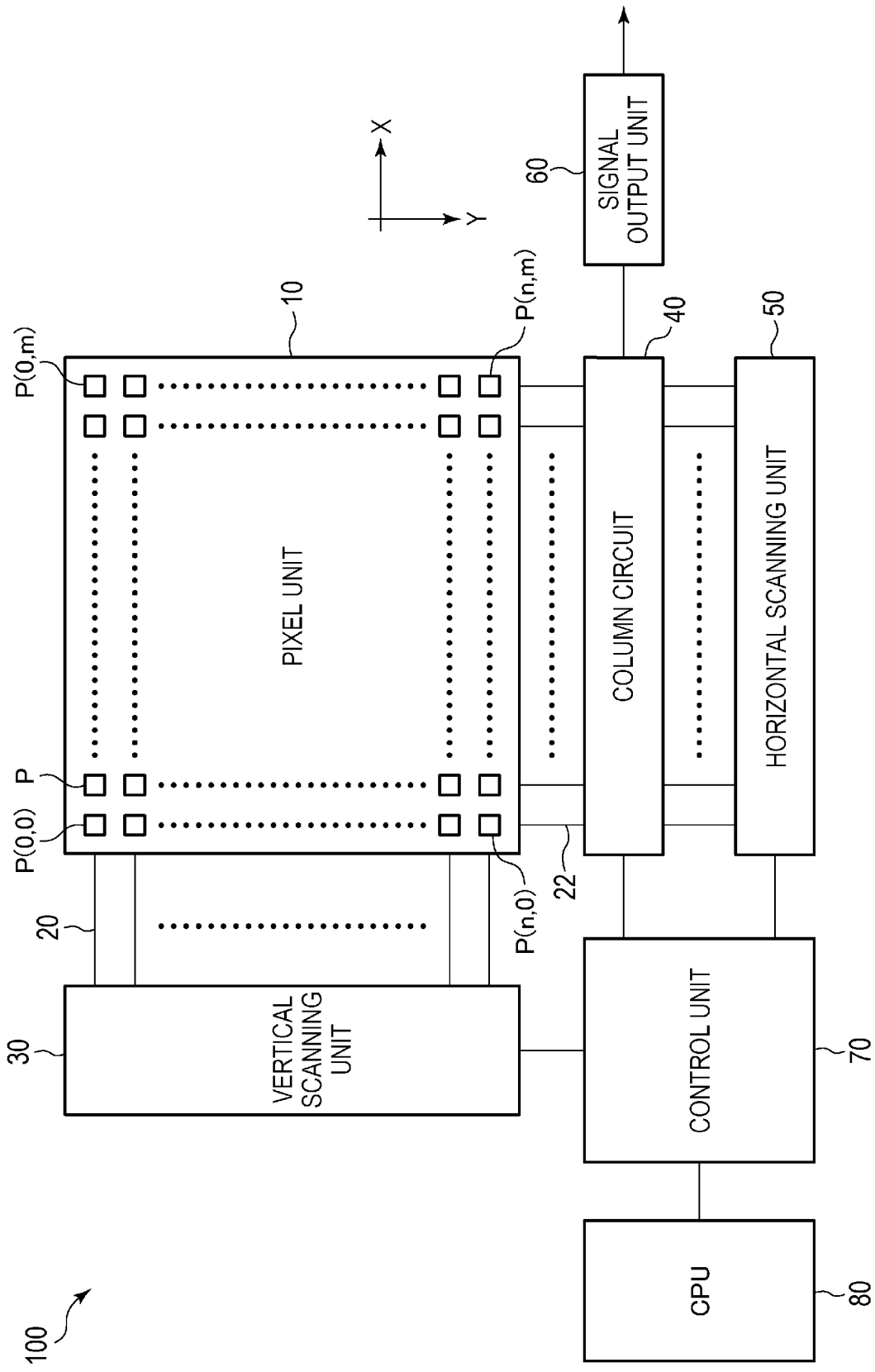
FIG. 1 is a block diagram illustrating a general configuration of an imaging device according to a first embodiment of the present invention.
Figure 2:
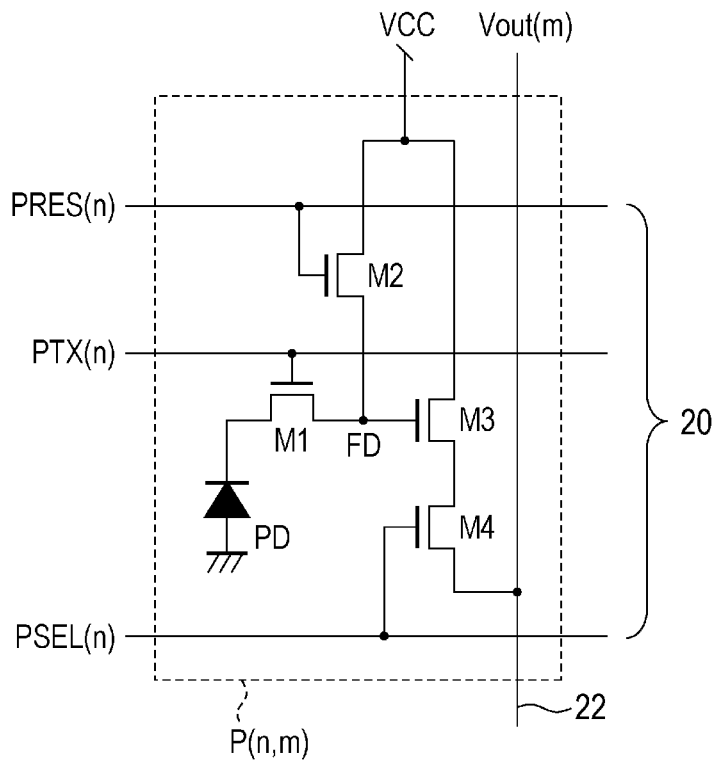
FIG. 2 is a circuit diagram illustrating a configuration example of a pixel in the imaging device according to the first embodiment of the present invention.
Figure 3:
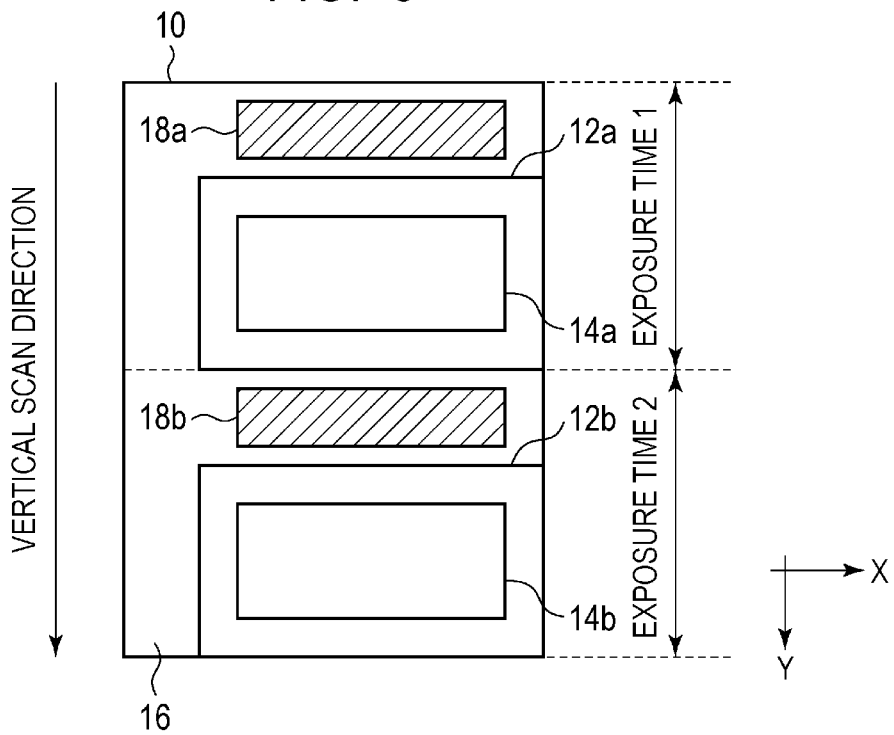
FIG. 3 is a block diagram illustrating a configuration example of a pixel unit in the imaging device according to the first embodiment of the present invention.

First, the structure of the imaging device according to the present embodiment will be described by using FIG. 1 to FIG. 3. FIG. 1 is a block diagram illustrating a general configuration of an imaging device according to the present embodiment. FIG. 2 is a circuit diagram illustrating a configuration example of a pixel in the imaging device according to the present embodiment. FIG. 3 is a block diagram illustrating a configuration example of a pixel unit in the imaging device according to the present embodiment.

As illustrated in FIG. 1, an imaging device 100 according to the present embodiment includes a pixel unit 10, a vertical scanning unit 30, a column circuit 40, a horizontal scanning unit 50, a signal output unit 60, a control unit 70, and a CPU 80.

In the pixel unit 10, a plurality of pixels P are arranged over a plurality of rows and a plurality of columns. FIG. 1 illustrates pixels P(0, 0) to pixel P(n, m) arranged in a two-dimensional manner of (n+1) rows by (m+1) columns. With respect to pixel P(X, Y) as used herein, X denotes the row number, and Y denotes the column number. The row number on the first row is 0-th row, and the column number on the first column is 0-th column. Note that, in the present specification, a pixel P is denoted with the row number and the column number such as "pixel P (n, m)" when the pixel P arranged at a particular position within the pixel unit 10 is indicated, and a pixel P is denoted simply as "pixel P" when the position thereof within the pixel unit 10 is not specified.

On each row of the pixel unit 10, a control line 20 is arranged extending in a first direction (X-direction in FIG. 1). The control line 20 is connected to respective pixels P arranged in the first direction to form a signal line common to these pixels P. In the present specification, the first direction in which the control line 20 extends may be denoted as a row direction.

Further, on each column of the pixel unit 10, an output line 22 is arranged extending in a second direction (Y-direction in FIG. 1) intersecting with the first direction. The output line 22 is connected to respective pixels P arranged in the second direction to form a signal line common to these pixels P. In the present specification, the second direction in which the output line 22 extends may be denoted as a column direction.

The control line 20 on each row is connected to the vertical scanning unit 30. Further, the output line 22 on each column is connected to the column circuit 40. The horizontal scanning unit 50 and the signal output unit 60 are connected to the column circuit 40 on each column. The control unit 70 is connected to the vertical scanning unit 30, the column circuit 40, and the horizontal scanning unit 50. The CPU 80 is connected to the control unit 70.

The vertical scanning unit 30 is a circuit unit that supplies, to the pixels P via the control lines 20, control signals used for driving readout circuits within the pixels P. The vertical scanning unit 30 operates in response to a signal from the control unit 70 and performs a shutter scan and a readout scan of the pixel unit 10. Note that a shutter scan refers to an operation of resetting the photoelectric conversion elements on the pixels P on some or all of the rows in the pixel unit 10 sequentially on a row-by-row basis and starting exposure (accumulation of charges). A readout scan refers to an operation of outputting signals based on charges, which have been accumulated in the photoelectric conversion elements from the pixels P on some or all of the rows of the pixel unit 10, sequentially on a row-by-row basis.

The column circuit 40 includes amplifier circuits, analog-to-digital conversion (AD conversion) circuit, memories, or the like. The column circuit 40 amplifies pixel signals output from the pixels P, performs AD conversion thereon, and holds the AD-converted signals in the memories as digital pixel signals.

The horizontal scanning unit 50 operates in response to a signal from the control unit 70 and outputs control signals sequentially to the memory on each column of the column circuit 40. The column circuit 40 that has received a control signal from the horizontal scanning unit 50 outputs, to the signal output unit 60, a digital pixel signal held in the memory on the corresponding memory.

The signal output unit 60 includes an external interface or the like such as a digital signal processing unit, a parallel-to-serial conversion circuit, a low voltage differential signaling (LVDS) circuit, or the like. The signal output unit 60 implements digital signal processing on a digital pixel signal received from the column circuit 40 and outputs the processed signals as serial data to the outside of the imaging device 100.

The control unit 70 is a circuit unit that supplies, to the vertical scanning unit 30, the column circuit 40, the horizontal scanning unit 50, and the like, control signals used for controlling the operation of the above units and the timing of the operation. At least some of these control signals may be supplied from the outside of the imaging device 100.

The CPU 80 controls the control unit 70. The control unit 70 operates in response to a control signal such as a synchronization signal or a setting signal for an operation mode or the like from the CPU 80. The CPU 80 may be provided inside an imaging system on which the imaging device 100 is mounted, that is, outside the imaging device 100.

Note that the column circuit 40 is not necessarily required to have a function of AD conversion and, for example, may perform AD conversion outside the imaging device 100. In such a case, the configuration of the horizontal scanning unit 50 and the signal output unit 60 may be appropriately changed so as to be adapted for a process of analog signals.

FIG. 2 is a circuit diagram illustrating a configuration example of the pixel P. The circuit illustrated in FIG. 2 is a typical pixel configuration used in an imaging device to which rolling shutter driving is applied. Each of the plurality of pixels P forming the pixel unit 10 includes a photoelectric converter PD, a transfer transistor M1, an FD reset transistor M2, an amplifier transistor M3, and a select transistor M4. Note that, while pixel P(n, m) arranged on the n-th row and the m-th column is illustrated in FIG. 2 as an example, the same applies to other pixels P.

The photoelectric converter PD is a photoelectric conversion element, for example, a photodiode. The photoelectric converter PD is formed of a photodiode, the anode thereof is connected to a ground node, and the cathode thereof is connected to the source of the transfer transistor M1. The drain of the transfer transistor M1 is connected to the source of the FD reset transistor M2 and the gate of the amplifier transistor M3. The connection node of the drain of the transfer transistor M1, the source of the FD reset transistor M2, and the gate of the amplifier transistor M3 is a so-called floating diffusion FD. The floating diffusion FD includes a capacitance component, functions as a charge holding portion, and forms charge-to-voltage converter formed of this capacitance component. The drain of the FD reset transistor M2 and the drain of the amplifier transistor M3 are connected to a power supply node (voltage VCC). The source of the amplifier transistor M3 is connected to the drain of the select transistor M4. The source of the select transistor M4 is connected to the output line 22. A current source (not illustrated) is connected to the output line 22. Note that the names of the source and the drain of each transistor may be different in accordance with a conductivity type, a function of interest, or the like of the transistor, and thus the opposite names of the source and the drain described above may be used.

In the case of the circuit configuration illustrated in FIG. 2, the control line 20 on each row includes a transfer gate signal line, an FD reset signal line, and a select signal line.

The transfer gate signal line is connected to the gate of the transfer transistor M1 of the pixels P belonging to the corresponding row and supplies, to the gate of the transfer transistor M1, a control signal PTX supplied from the vertical scanning unit 30. For example, a control signal PTX(n) is supplied to pixel P(n, m) via a transfer gate signal line on the n-th row.

The FD reset signal line is connected to the gate of the FD reset transistor M2 of the pixels P belonging to the corresponding row and supplies, to the gate of the FD reset transistor M2, a control signal PRES supplied from the vertical scanning unit 30. For example, a control signal PRES(n) is supplied to pixel P(n, m) via an FD reset signal line on the n-th row.

The select signal line is connected to the gate of the select transistor M4 of the pixels P belonging to the corresponding row and supplies, to the gate of the select transistor M4, a control signal PSEL supplied from the vertical scanning unit 30. For example, a control signal PSEL(n) is supplied to pixel P(n, m) via a select signal line on the n-th row.

When each transistor of the pixel P is formed of an n-channel transistor, the corresponding transistor is turned on when a high-level control signal is supplied from the vertical scanning unit 30, and the corresponding transistor is turned off when a low-level control signal is supplied from the vertical scanning unit 30. In this example, a high level corresponds to a logic value "1", and a low level corresponds to a logic level "0". Note that each transistor of the pixel P may be formed of a p-channel transistor. When each transistor of the pixel P is formed of a p-channel transistor, the signal level of a control signal used for driving each transistor will be opposite to the case of the n-channel transistor.

In response to an optical image of an object entering the pixel unit 10, the photoelectric converter PD of each pixel P converts (photoelectrically converts) the incident light into an amount of changes corresponding to the light amount and accumulates the generated charges. When turned on, the transfer transistor M1 transfers charges accumulated in the photoelectric converter PD to the floating diffusion FD.

The floating diffusion FD holds charges transferred from the photoelectric converter PD and, after charge-to-voltage conversion by the capacitance component of the floating diffusion FD, has a voltage corresponding to the amount of charges transferred from the photoelectric converter PD. The amplifier transistor M3 is configured such that the drain thereof is supplied with the voltage VCC and the source thereof is supplied with a bias current via the select transistor M4 and forms an amplifier unit (source follower circuit) whose gate is the input node. Thereby, the amplifier transistor M3 outputs a pixel signal based on a voltage of the floating diffusion FD (a pixel signal Vout(m) of the pixel P on the m-th column) to the output line 22 via the select transistor M4.

When turned on, the FD reset transistor M2 resets the floating diffusion FD to a voltage corresponding to the voltage VCC. Further, when the FD reset transistor M2 and the transfer transistor M1 are turned on at the same time, the photoelectric converter PD can be reset to a voltage corresponding to the voltage VCC. The FD reset transistor M2 and the transfer transistor M1 form a reset unit that resets the photoelectric converter PD.

As illustrated in FIG. 3, the pixel unit 10 includes effective pixel regions 12a and 12b and an optical black region (hereinafter, denoted as "OB region") 16. Each of the effective pixel regions 12a and 12b is a region in which pixels (effective pixels) P which include the photoelectric converters PD and can output signals corresponding to an incident light amount are arranged. The OB region 16 is a region in which pixels (optical black pixel (hereinafter, denoted as "OB pixel")) P covered with a light-shielding film are arranged.

The effective pixel region 12a includes an imaging region 14a. The effective pixel region 12b includes an imaging region 14b. The imaging regions 14a and 14b are regions in which pixels P used for acquiring a captured image are arranged out of the pixels P of the effective pixel regions 12a and 12b, respectively. The imaging regions 14a and 14b may be the same as the effective pixel regions 12a and 12b, respectively, or may be smaller than the effective pixel regions 12a and 12b, respectively.

The OB region 16 includes reference regions 18a and 18b. The reference region 18a is a region in which the pixels P used for calculating offset components superimposed on pixel signals acquired from the pixels P arranged in the imaging region 14a are arranged. Also, the reference region 18b is a region in which the pixels P used for calculating offset components superimposed on pixel signals acquired from the pixels P arranged in the imaging region 14b are arranged.

Each of the imaging regions 14a and 14b and the reference regions 18a and 18b includes at least one pixel P. That is, the minimum unit in the row direction (X-direction in FIG. 3) in these regions is one column, and the minimum unit in the column direction (Y-direction in FIG. 3) is one row. Typically, each of the imaging regions 14a and 14b and the reference regions 18a and 18b includes a plurality of rows and a plurality of columns.

The effective pixel region 12a and the effective pixel region 12b are aligned in the column direction interposing the OB region 16 within the pixel unit 10. In other words, the row on which the effective pixel region 12a is provided and the row on which the effective pixel region 12b is provided are different from each other. The column on which the effective pixel region 12a is provided and the column on which the effective pixel region 12b is provided may partially or fully overlap with each other.

A region inside the pixel unit 10 other than the regions in which the effective pixel region 12a and the effective pixel region 12b are provided is the OB region 16. In the arrangement example illustrated in FIG. 3, the OB region 16 includes rows including all the columns (rows located over and under the effective pixel region 12a in FIG. 3) and a column including all the rows (a column located on the left side of the effective pixel regions 12a and 12b in FIG. 3).

The reference region 18b is arranged in the OB region 16 between the effective pixel region 12a and the effective pixel region 12b. The reference region 18a is arranged adjacent to the effective pixel region 12a in the column direction so as to interpose the effective pixel region 12a between the reference region 18a and the reference region 18b. That is, the reference region 18a, the effective pixel region 12a, the reference region 18b, and the effective pixel region 12b are arranged in this order in the column direction. The reference region 18a, the effective pixel region 12a, the reference region 18b, and the effective pixel region 12b are arranged on different rows. Note that the reference region 18a may be in contact with the effective pixel region 12a. Further, the reference region 18b may be in contact with the effective pixel region 12a and/or the effective pixel region 12b.

Further, the reference region 18a is arranged so as to at least include one or more columns on which the imaging region 14a is arranged. Also, the reference region 18b is arranged so as to at least include one or more columns on which the imaging region 14b is arranged. In one example, the reference region 18a, the imaging region 14a, the reference region 18b, and the imaging region 14b are arranged on the same one or more columns. Further, the reference region 18a is typically configured to include no effective pixel at all. However, the embodiment is not limited to this example, and while effective pixels may be provided on each row of the reference region 18a, the reference region 18a is configured such that the number of OB pixels is greater than the number of effective pixels.

In FIG. 3, the exposure time of the pixels P arranged in the imaging region 14a (exposure time 1) and the exposure time of the pixels P arranged in the imaging region 14b (exposure time 2) are controlled independently. The pixels P arranged in the reference region 18a are controlled in the same condition as for the pixels P arranged in the imaging region 14a. Also, the pixels P arranged in the reference region 18b are controlled in the same condition as for the pixels P arranged in the imaging region 14b. Note that the same condition as used herein means that the length of a period from a timing when a reset operation of the photoelectric converter PD ends to a timing when charge transfer from the photoelectric converter PD to the floating diffusion FD ends is the same. This period corresponds to the exposure time in the case of the pixels P arranged in the effective pixel regions 12a and 12b.

As discussed above, the pixel unit 10 of the imaging device according to the present embodiment includes the plurality of imaging regions 14a and 14b for which the exposure time can be set independently. Further, the pixel unit 10 of the imaging device according to the present embodiment includes the plurality of reference regions 18a and 18b associated with the imaging regions 14a and 14b. The pixels P arranged in the imaging region 14a and the pixels P arranged in the reference region 18a associated in the imaging region 14a are controlled in the same condition. Further, the pixels P arranged in the imaging region 14b and the pixels P arranged in the reference region 18b associated in the imaging region 14b are controlled in the same condition.

In general, OB pixels arranged in an OB region are used for calculating offset components superimposed on pixel signals of the effective pixels due to heat or circuit structure. When the length of exposure time or the exposure timing is different between the imaging region 14a and the imaging region 14b, however, respective offset components superimposed on pixel signals will be different due to the difference in the length of exposure time or the exposure timing. Thus, when the same offset value is used for a pixel signal acquired from the imaging region 14a and a pixel signal acquired from the imaging region 14b to perform offset correction, accuracy of offset correction is reduced for at least one of the pixel signals.

In terms of the above, in the imaging device according to the present embodiment, the reference region 18a associated with the imaging region 14a and the reference region 18b associated with the imaging region 14b are arranged in the OB region 16 of the pixel unit 10. Further, the vertical scanning unit 30 has a function of controlling the pixels P arranged in the imaging region 14a and the reference region 18a and the pixels P arranged in the imaging region 14b and the reference region 18b in respective different conditions (lengths of exposure time).

Such a configuration allows an appropriate offset value for a pixel signal acquired from the imaging region 14a to be calculated based on a pixel signal acquired from the reference region 18a. Further, an appropriate offset value for a pixel signal acquired from the imaging region 14b can be calculated based on a pixel signal acquired from the reference region 18b. This enables more appropriate offset correction to be performed for both the imaging regions 14a and 14b in which the exposure time is different.

Further, pixel characteristics may have an in-plane distribution, and it is therefore desirable that the reference region in which the OB pixels used for acquiring offset values are arranged be located near an imaging region. In this regard, in the present embodiment, the reference region 18b is arranged between the imaging region 14a and the imaging region 14b to have a shorter physical distance between the imaging region 14b and the reference region 18b. This allows a more appropriate offset value to be calculated for a pixel signal acquired from the imaging region 14b.

Further, when an area sensor in which the pixels P are arranged two-dimensionally is used to form a focus detection device of a phase difference detection scheme as illustrated in FIG. 1, the positions of the plurality of imaging regions are fixed by the configuration of the optical system. Specifically, a separator lens (two-dimensional image capturing lens) for pupil division is used as an optical system that guides a light into the imaging device. In this case, the separator lens guides a light to the position of the imaging region illustrated in FIG. 5 and guides no light to other regions. In such a case, a region between imaging regions may be shielded from light to form an OB region, and this OB region can be used as a reference region used for acquiring an offset value. Such a configuration allows for a reduction in the OB region arranged in a region not interposed between imaging regions, a reduction in area of the pixel unit 10, and thus a reduction in size of the imaging device.

Figure 4:
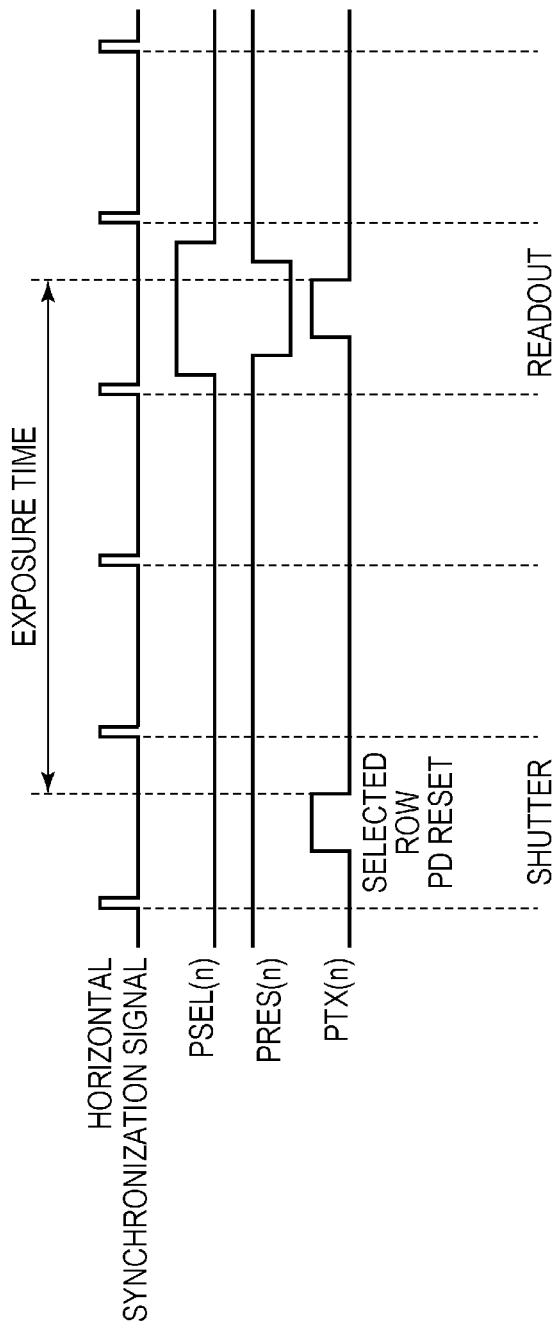
FIG. 4 and FIG. 5 are timing charts illustrating a method of driving the imaging device according to the first embodiment of the present invention.
Figure 5:
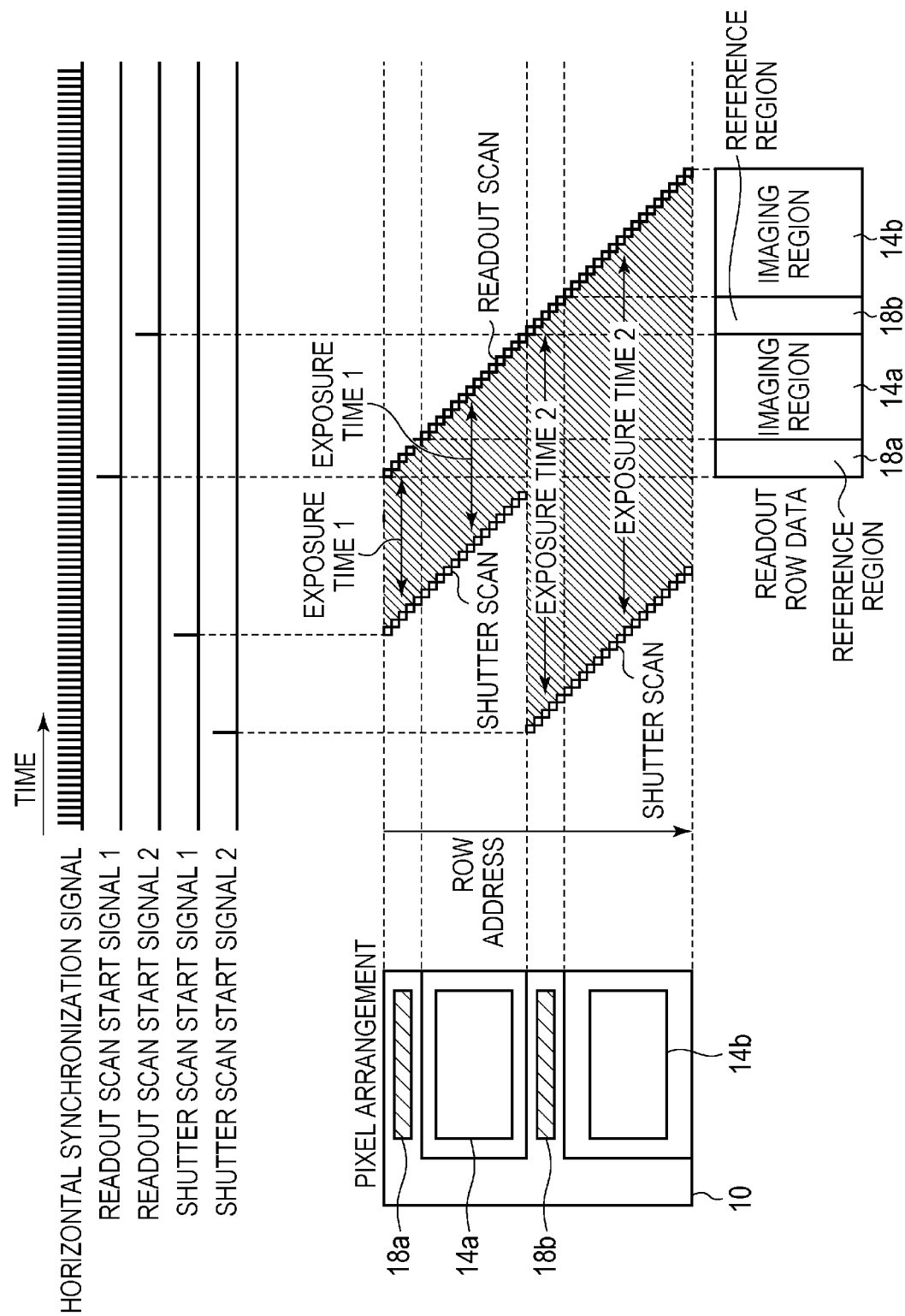
Figure 6:
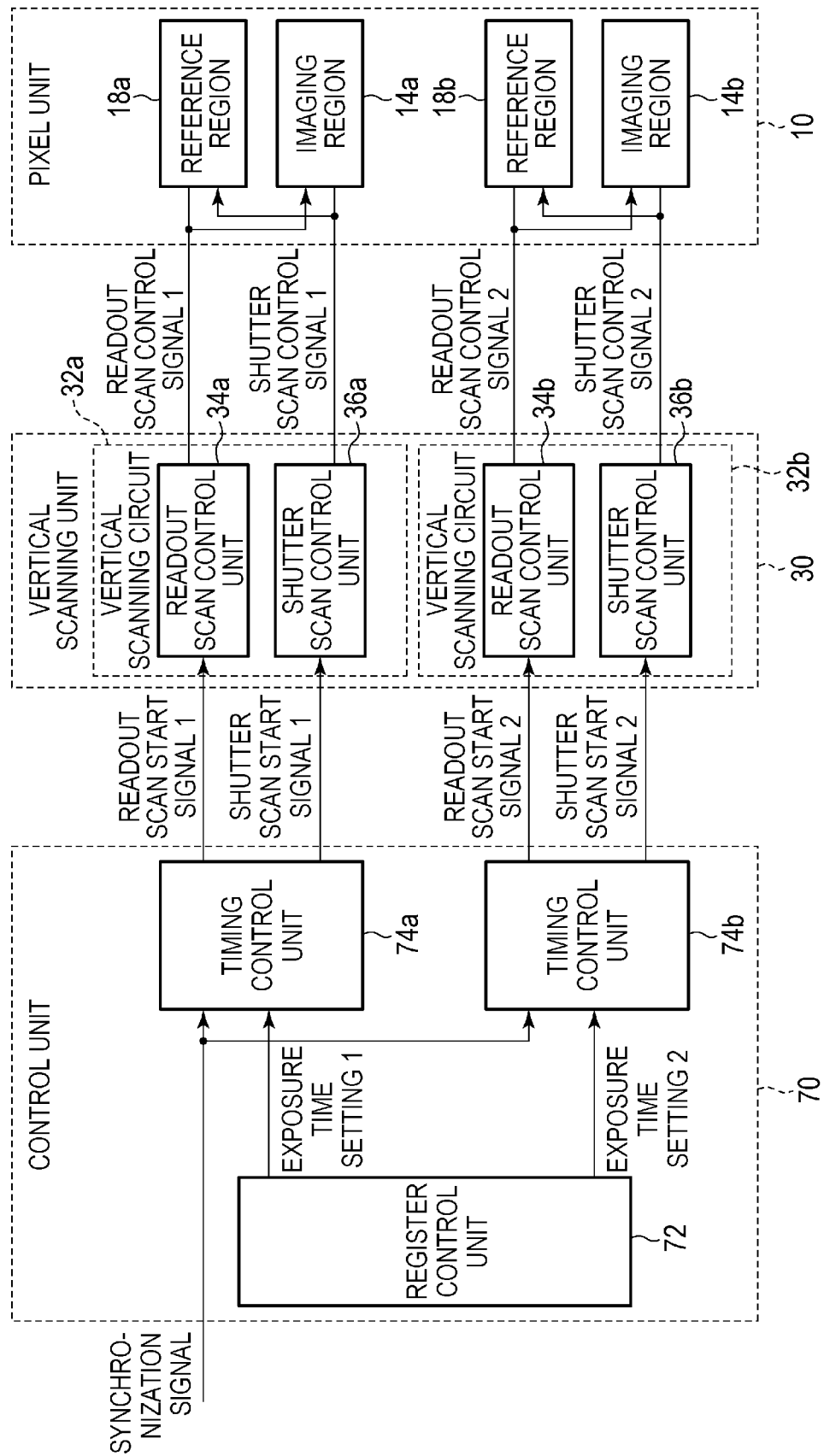
FIG. 6 is a block diagram illustrating a configuration example of a control unit and a vertical scanning unit of the imaging device according to the first embodiment of the present invention.

Next, a method of driving the imaging device according to the present embodiment will be described by using FIG. 4 to FIG. 6. FIG. 4 and FIG. 5 are timing charts illustrating a method of driving the imaging device according to the present embodiment. FIG. 6 is a block diagram illustrating a configuration example of a control unit and a vertical scanning unit of the imaging device according to the present embodiment.

FIG. 4 is a timing chart illustrating an outline of a shutter operation and a readout operation on each row of the pixel unit 10. Note that FIG. 4 illustrates the operation on the n-the row as an example.

In a shutter operation, the control single PRES(n) and the control signal PTX(n) are controlled to a high level to turn on the transfer transistor M1 and the FD reset transistor M2 at the same time. Thereby, the photoelectric converter PD is connected to the power supply node via the transfer transistor M1 and the FD reset transistor M2, and the photoelectric converter PD is reset to the potential corresponding to the voltage VCC. Then, the timing when the control signal PTX(n) is controlled to a low level to release the reset of the photoelectric converter PD is the time of the start of a charge accumulation period in the photoelectric converter PD, that is, the start of exposure.

In a readout operation, the control signal PRES(n) is controlled to a low level, the control signals PSEL(n) and PTX(n) are controlled to a high level, and thereby the transfer transistor M1 and the select transistor M4 are turned on at the same time in a state where the FD reset transistor M2 is in an off-state. Thereby, charges accumulated in the photoelectric converter PD are transferred to the floating diffusion FD. Then, the timing when the control signal PTX(n) is controlled to a low level to complete the charge transfer to the floating diffusion FD is the time of the end of the charge accumulation period in the photoelectric converter PD, that is, the end of exposure.

In response to charges being transferred from the photoelectric converter PD to the floating diffusion FD, the floating diffusion FD has a potential based on the amount of the transferred charges. Thereby, the amplifier transistor M3 outputs a pixel signal based on the potential of the floating diffusion FD to the output line 22 via the select transistor M4. As discussed above, the readout operation is an operation that includes charge transfer to transfer charges generated in the photoelectric converter PD to the floating diffusion FD and performs readout of a pixel signal based on charges generated by the photoelectric converter PD.

In rolling shutter driving, a shutter scan and a readout scan are performed by performing pixel driving of one row described above and sequentially selecting rows on the pixel unit 10.

FIG. 5 is a timing chart illustrating an outline of the operation of the entire pixel unit 10. FIG. 5 illustrates a drive example in which readout of data on one row is performed for each input the horizontal synchronization signal.

FIG. 5 illustrates, in the upper part, timings of a horizontal synchronization signal, a readout scan start signal 1, a readout scan start signal 2, a shutter scan start signal 1, and a shutter scan start signal 2.

The readout scan start signal 1, the readout scan start signal 2, the shutter scan start signal 1, and the shutter scan start signal 2 are control signals output from the control unit 70 to the vertical scanning unit 30 at predetermined timings. The readout scan start signal 1 is a signal which instructs the vertical scanning unit 30 to start a readout scan of rows on which the exposure time is set to an exposure time 1 (the imaging region 14a, the reference region 18a). The readout scan start signal 2 is a signal which instructs the vertical scanning unit 30 to start a readout scan of rows on which the exposure time is set to an exposure time 2 (the imaging region 14b, the reference region 18b). The shutter scan start signal 1 is a signal which instructs the vertical scanning unit 30 to start a shutter scan of rows on which the exposure time is set to an exposure time 1 (the imaging region 14a, the reference region 18a). The shutter scan start signal 2 is a signal which instructs the vertical scanning unit 30 to start a shutter scan of rows on which the exposure time is set to an exposure time 2 (the imaging region 14b, the reference region 18b).

FIG. 5 illustrates, in the lower part, an outline of the operation corresponding to the signals illustrated in the upper part. Each of the rectangular block groups indicated as "shutter scan" and "readout scan" corresponds to "shutter operation" and "readout operation" illustrated with FIG. 4. FIG. 5 visually represents that an operation in which shutter operations of respective rows are performed sequentially on a row-by-row basis is a shutter scan, and an operation in which readout operations of respective rows are performed sequentially on a row-by-row basis is a readout scan.

The readout scan of the reference region 18a and the imaging region 14a is started in response to the vertical scanning unit 30 receiving the readout scan start signal 1. Further, the readout scan of the reference region 18b and the imaging region 14b is started in response to the vertical scanning unit 30 receiving the readout scan start signal 2.

In the drive example of FIG. 5, it is assumed that a readout operation on one row is performed during one horizontal period defined by the interval of the horizontal synchronization signal and that a readout operation on the next row is performed during the next one horizontal period. In such a way, readout operations of the pixels P on the rows belonging to the reference region 18a, the imaging region 14a, the reference region 18b, and the imaging region 14b are performed sequentially on a row-by-row basis. Since readout operations of a plurality of rows are not performed at the same time in the drive example of FIG. 5, the readout scan of each region of the reference region 18a, the imaging region 14a, the reference region 18b, and the imaging region 14b is not performed at the same time.

The shutter scan of the reference region 18a and the imaging region 14a is started in response to the vertical scanning unit 30 receiving the shutter scan start signal 1. The timing when the shutter scan start signal 1 is output from the control unit 70 is set to the timing that goes back to the time corresponding to the exposure time 1 from the timing when the readout scan start signal 1 is output from the control unit 70. The shutter scan of the reference region 18b and the imaging region 14b is started in response to the vertical scanning unit 30 receiving the shutter scan start signal 2. The timing when the shutter scan start signal 2 is output from the control unit 70 is set to the timing that goes back to the time corresponding to the exposure time 2 from the timing when the readout scan start signal 2 is output from the control unit 70.

In a similar manner to the case of a readout operation, it is assumed in the drive example of FIG. 5 that a shutter operation on one row is performed during one horizontal period and that a shutter operation on the next row is performed during the next one horizontal period. In such a way, a shutter operation of the reference region 18a and the imaging region 14a and a shutter operation of the reference region 18b and the imaging region 14b are performed sequentially on a row-by-row basis. Further, the vertical scanning unit 30 controls the shutter operation of the reference region 18a and the imaging region 14a and the shutter operation of the reference region 18b and the imaging region 14b independently. Thereby, the imaging device of the present embodiment can set the length of the exposure time or the exposure timing of the reference region 18a and the imaging region 14a independently of the length of the exposure time or the exposure timing of the reference region 18b and the imaging region 14b.

In the drive example illustrated in FIG. 5, rows in the reference region 18a and rows in the imaging region 14a that are driven in the same condition are continuously scanned. Further, rows in the reference region 18b and rows in the imaging region 14b that are driven in the same condition are continuously scanned. It is therefore possible to simplify switching of control between regions and also prevent the configuration of the vertical scanning unit 30 from being complex.

Note that, while a readout scan of the reference region 18b and the imaging region 14b is performed after a readout scan of the reference region 18a and the imaging region 14a in the timing chart illustrated in FIG. 5, the order of the readout scans may be opposite. In such a case, the start timing of a shutter scan may be changed as appropriate in accordance with the exposure time set for each region.

Further, while the case where a single row only is read out during one horizontal period is illustrated in the timing chart in FIG. 5, the number of rows to be read out during one horizontal period is not necessarily required to be one. For example, the number of rows selected as a shutter row and the number of rows selected as a readout row in a certain horizontal period may be increased and controlled to have constant exposure time, and thereby readout of a plurality of rows can be performed during one horizontal period.

The readout data of the pixel unit 10 acquired in such a way is output on a row-by-row basis in the order of an output value of the reference region 18a, an output value of the imaging region 14a, an output value of the reference region 18b, and then an output value of the imaging region 14b, as illustrated in FIG. 5.

An offset correction process of subtracting output values of the pixels P arranged in the reference regions 18a and 18b from output values of the pixels P arranged in the imaging regions 14a and 14b may be performed inside the imaging device 100 or may be performed outside the imaging device 100. When an offset correction process is performed inside the imaging device 100, the imaging device 100 further includes a signal processing unit that performs the offset correction process.

FIG. 6 is a block diagram illustrating a configuration example of the control unit 70 and the vertical scanning unit 30 for implementing the driving illustrated in FIG. 5. Note that the configuration of the control unit 70 and the vertical scanning unit 30 illustrated in FIG. 6 is an example and not limited thereto.

As illustrated in FIG. 6, the control unit 70 includes a register control unit 72 and timing control units 74, and the number of the timing control units 74 corresponds to the number of setting regions of exposure time. It is assumed here that the pixel unit 10 includes the imaging region 14a with exposure time 1 and the imaging region 14b with exposure time 2, and a configuration example in which the control unit 70 includes a timing control unit 74a associated with the exposure time 1 and a timing control unit 74b associated with the exposure time 2 will be described.

The register control unit 72 holds information on the setting of exposure time of the imaging regions 14a and 14b within the pixel unit 10 or the like and outputs the held information to the timing control units 74a and 74b.

The timing control unit 74a generates a timing signal (readout scan start signal 1) that provides an instruction on the start of a readout scan in a region set in the exposure time 1 in accordance with a control signal (exposure time setting 1) supplied from the register control unit 72 and a synchronization signal. Further, the timing control unit 74a generates a timing signal (shutter scan start signal 1) that provides an instruction on the start of a shutter scan in a region set in the exposure time 1 in accordance with a control signal (exposure time setting 1) supplied from the register control unit 72 and a synchronization signal. In this example, the regions set for the exposure time 1 are the reference region 18a and the imaging region 14a.

Similarly, the timing control unit 74b generates a timing signal (readout scan start signal 2) that provides an instruction on the start of a readout scan in a region set in the exposure time 2 in accordance with a control signal (exposure time setting 2) supplied from the register control unit 72 and a synchronization signal. Further, the timing control unit 74b generates a timing signal (shutter scan start signal 2) that provides an instruction on the start of a shutter scan in a region set in the exposure time 2 in accordance with a control signal (exposure time setting 2) supplied from the register control unit 72 and a synchronization signal. In this example, the regions set for the exposure time 2 are the reference region 18b and the imaging region 14b.

The vertical scanning unit 30 includes vertical scanning circuits 32, and the number of the vertical scanning circuits 32 corresponds to the number of setting values of exposure time. It is assumed here that the pixel unit 10 includes a region set to the exposure time 1 and a region set to the exposure time 2, and a configuration example in which vertical scanning unit 30 includes a vertical scanning circuit 32a associated with the exposure time 1 and a vertical scanning circuit 32b associated with the exposure time 2 will be described.

The vertical scanning circuit 32a includes a readout scan control unit 34a and a shutter scan control unit 36a. The readout scan control unit 34a operates upon receiving a readout scan start signal (readout scan start signal 1) from the control unit 70 and outputs a readout scan control signal (readout scan control signal 1) to the pixel unit 10. The shutter scan control unit 36a operates upon receiving a shutter scan start signal (shutter scan start signal 1) from the control unit 70 and outputs a shutter scan control signal (shutter scan start control signal 1) to the pixel unit 10.

Similarly, the vertical scanning circuit 32b includes a readout scan control unit 34b and a shutter scan control unit 36b. The readout scan control unit 34b operates upon receiving a readout scan start signal (readout scan start signal 2) from the control unit 70 and outputs a readout scan control signal (readout scan control signal 2) to the pixel unit 10. The shutter scan control unit 36b operates upon receiving a shutter scan start signal (shutter scan start signal 2) from the control unit 70 and outputs a shutter scan control signal (shutter scan control signal 2) to the pixel unit 10.

The pixels P in the reference region 18a and the imaging region 14a associated with the exposure time 1 are controlled by the readout scan control signal 1 output from the readout scan control unit 34a and the shutter scan control signal 1 output from the shutter scan control unit 36a. Also, the pixels P in the reference region 18b and the imaging region 14b associated with the exposure time 2 are controlled by the readout scan control signal 2 output from the readout scan control unit 34b and the shutter scan control signal 2 output from the shutter scan control unit 36b. The readout scan control signal 1, the shutter scan control signal 1, the readout scan control signal 2, and the shutter scan control signal 2 are formed of the control signals PSEL, PRES, and PTX on the corresponding row.

With such a configuration of the control unit 70 and the vertical scanning unit 30, it is possible to control the pixels P arranged in the imaging region 14a and the reference region 18a and the pixels P arranged in the imaging region 14b and the reference region 18b in different conditions (exposure time) to realize the driving illustrated in FIG. 5.

As described above, according to the present embodiment, appropriate offset correction can be performed even when the exposure time is different in a plurality of imaging regions.

Second Embodiment

Figure 7:
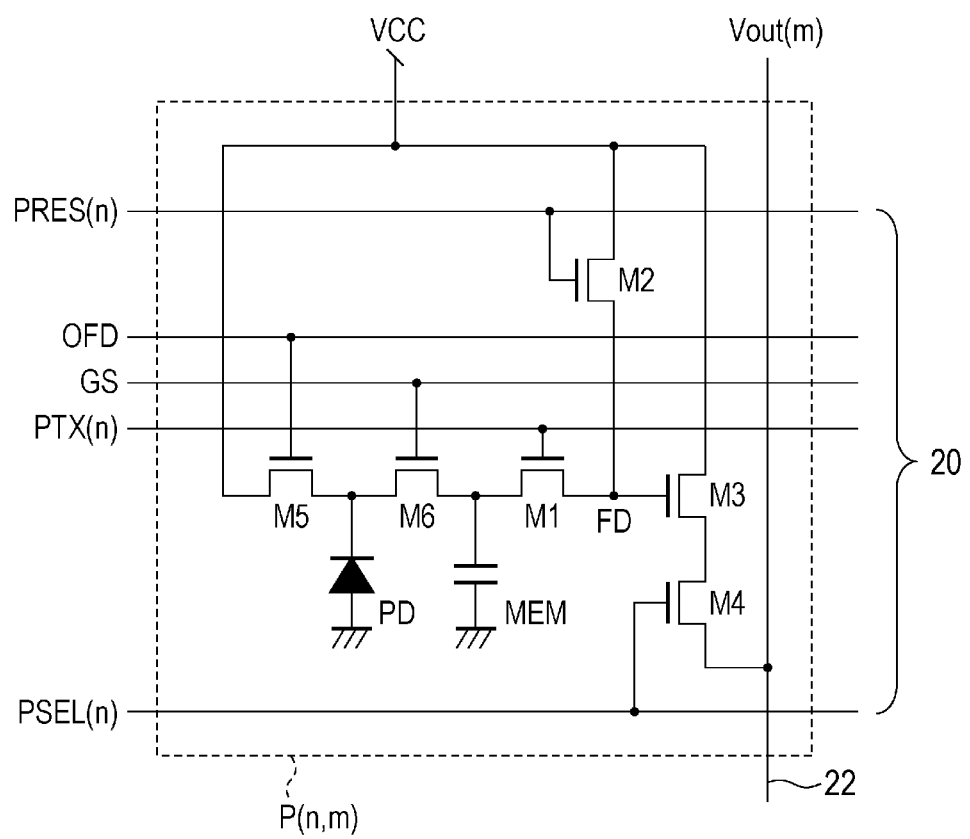
FIG. 7 is a circuit diagram illustrating a configuration example of a pixel in an imaging device according to a second embodiment of the present invention.
Figure 8:
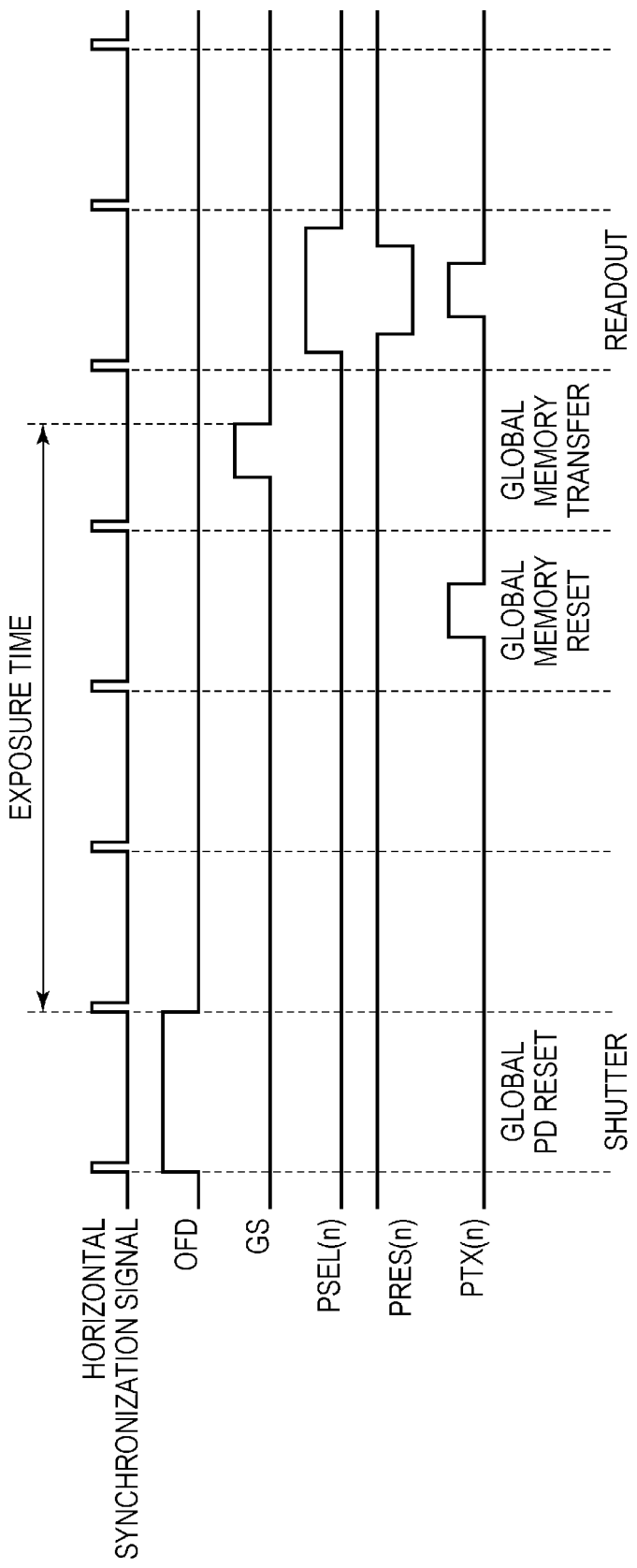
FIG. 8 and FIG. 9 are timing charts illustrating a method of driving the imaging device according to the second embodiment of the present invention.
Figure 9:
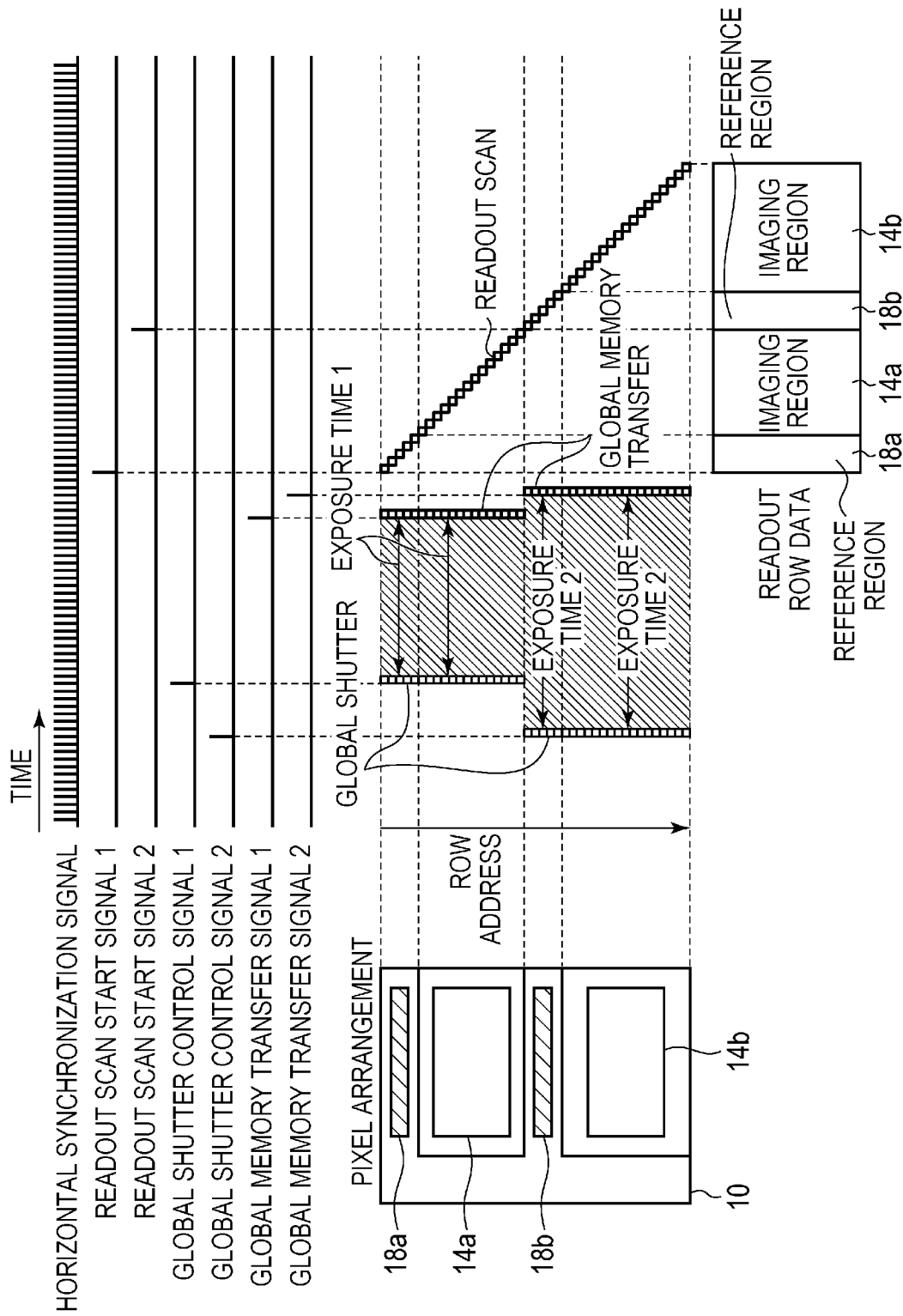

An imaging device and a method of driving the same according to a second embodiment of the present invention will be described with reference to FIG. 7 to FIG. 9. FIG. 7 is a circuit diagram illustrating a configuration example of a pixel in an imaging device according to the present embodiment. FIG. 8 and FIG. 9 are timing charts illustrating the method of driving the imaging device according to the present embodiment. The same components as those of the imaging device of the first embodiment will be labeled with the same references, and the description will be omitted or simplified.

In the present embodiment, an example application of the present invention to an imaging device having a global shutter function will be described. The imaging device according to the present embodiment has the same basic configuration as that of the imaging device according to the first embodiment except that the circuit configuration of the pixel P is different. For example, the setting of regions in the pixel unit 10 and the advantages obtained therefrom are the same as those in the case of the first embodiment.

As illustrated in FIG. 7, the pixel P of the imaging device according to the present embodiment further includes a PD reset transistor M5 and a transfer transistor M6 in addition to the photoelectric converter PD, the transfer transistor M1, the FD reset transistor M2, the amplifier transistor M3, and the select transistor M4. The circuit illustrated in FIG. 7 is a typical pixel configuration used in an imaging device to which global shutter driving is applied. Note that, while a pixel P(n, m) arranged on the n-th row and m-th column is illustrated in FIG. 7 as an example, the same applies to other pixels P.

The photoelectric converter PD is formed of a photodiode, the anode thereof is connected to the ground node, and the cathode thereof is connected to the source of the PD reset transistor M5 and the source of the transfer transistor M6. The drain of the transfer transistor M6 is connected to the source of the transfer transistor M1. The connection node of the drain of the transfer transistor M6 and the source of the transfer transistor M1 includes a capacitance component and functions as a charge holding portion MEM. FIG. 7 represents this capacitance component as a capacitor element. The drain of the transfer transistor M1 is connected to the source of the FD reset transistor M2 and the gate of the amplifier transistor M3. The connection node of the drain of the transfer transistor M1, the source of the FD reset transistor M2, and the gate of the amplifier transistor M3 is the floating diffusion FD. The drain of the FD reset transistor M2, the drain of the PD reset transistor M5, and the drain of the amplifier transistor M3 are connected to the power supply node (voltage VCC). The source of the amplifier transistor M3 is connected to the drain of the select transistor M4. The source of the select transistor M4 is connected to the output line 22. A current source (not illustrated) is connected to the output line 22.

In the case of the circuit configuration illustrated in FIG. 7, the control line 20 on each row includes first and second transfer gate signal lines, an FD reset signal line, a PD reset signal line, and a select signal line.

The first transfer gate signal line is connected to the gate of the transfer transistor M1 of the pixels P belonging to the corresponding row and supplies, to the gate of the transfer transistor M1, a control signal PTX supplied from the vertical scanning unit 30. For example, a control signal PTX(n) is supplied to pixel P(n, m) via the first transfer gate signal line on the n-th row.

The second transfer gate signal line is connected to the gate of the transfer transistor M6 of the pixels P belonging to the corresponding row and supplies, to the gate of the transfer transistor M6, a control signal GS supplied from the vertical scanning unit 30. Note that a common control signal GS is supplied to the second transfer gate signal lines on a plurality of rows including the pixels P having the same drive condition (exposure time).

The FD reset signal line is connected to the gate of the FD reset transistor M2 of the pixels P belonging to the corresponding row and supplies, to the gate of the FD reset transistor M2, a control signal PRES supplied from the vertical scanning unit 30. For example, a control signal PRES(n) is supplied to pixel P(n, m) via the FD reset signal line on the n-th row.

The PD reset signal line is connected to the gate of the PD reset transistor M5 of the pixels P belonging to the corresponding row and supplies, to the gate of the PD reset transistor M5, a control signal OFD supplied from the vertical scanning unit 30. Note that a common control signal OFD is supplied to the PD reset signal lines on a plurality of rows including the pixels P having the same drive condition (exposure time).

The select signal line is connected to the gate of the select transistor M4 of the pixels P belonging to the corresponding row and supplies, to the gate of the select transistor M4, a control signal PSEL supplied from the vertical scanning unit 30. For example, a control signal PSEL(n) is supplied to pixel P(n, m) via the select signal line on the n-th row.

When an optical image of an object enters the pixel unit 10, the photoelectric converter PD of each pixel P converts (photoelectrically converts) an incident light into an amount of charges corresponding to the light amount and accumulates the generated charges. When turned on, the transfer transistor M6 transfers charges accumulated in the photoelectric converter PD to the charge holding portion MEM. Note that the charge transfer from the photoelectric converters PD to the charge holding portions MEM on a plurality of rows including the pixels P of the same drive condition (exposure time) is globally performed (global memory transfer operation). When turned on, the transfer transistor M1 transfers charges held by the charge holding portion MEM to the floating diffusion FD.

The floating diffusion FD holds charges transferred from the photoelectric converter PD and has a voltage corresponding to the amount of charges transferred from the photoelectric converter PD by charge-to-voltage conversion due to the capacitance component of the floating diffusion FD. The amplifier transistor M3 is configured such that the drain thereof is supplied with the voltage VCC and the source thereof is supplied with a bias current via the select transistor M4 and forms an amplifier unit (source follower circuit) whose gate is the input node. Thereby, the amplifier transistor M3 outputs a pixel signal based on the voltage of the floating diffusion FD (a pixel signal Vout(m) in the pixel P on the m-th column) to the output line 22 via the select transistor M4.

When turned on, the FD reset transistor M2 resets the floating diffusion FD to a voltage corresponding to the voltage VCC. Further, when turned on, the PD reset transistor M5 resets the photoelectric converter PD to a voltage corresponding to the voltage VCC. The PD reset transistor M5 forms a reset unit that resets the photoelectric converter PD. With the PD reset transistor M5 being provided, it is possible to reset the photoelectric converter PD while charges are still held in the charge holding portion MEM. Note that the reset of the photoelectric converters PD on a plurality of rows including the pixels P of the same drive condition (exposure time) are globally performed (global shutter operation).

FIG. 8 is a timing chart illustrating an outline of the shutter operation and the readout operation on each row of the pixel unit 10. Note that FIG. 8 illustrates an operation on the n-th row as an example.

In the shutter operation in global shutter driving, the photoelectric converters PD of the pixels P on a plurality of rows are reset at the same time. In this context, the plurality of rows are rows on which the pixels P of the same exposure time are arranged, for example. For example, when the pixel unit 10 includes the imaging regions 14a and 14b and the reference regions 18a and 18b as illustrated in FIG. 3, the photoelectric converters PD of the pixels P on the row belonging to the imaging region 14a and the photoelectric converters PD of the pixels P on the rows belonging to the reference region 18a are reset at the same time. Further, the photoelectric converters PD of the pixels P on the row belonging to the imaging region 14b and the photoelectric converters PD of the pixels P on the rows belonging to the reference region 18b are reset at the same time. The photoelectric converters PD of the pixels P on all the rows may be reset at the same time.

The reset of the photoelectric converters PD of the pixels P on a plurality of rows is performed by supplying the same control signal OFD to the PD reset signal lines on these plurality of rows. The control signal OFD is controlled to a high level to turn on the PD reset transistor M5, and thereby the photoelectric converter PD is connected to the power supply node via the PD reset transistor M5, and the photoelectric converter PD is reset to the potential corresponding to the voltage VCC. Then, the timing when the control signal OFD is controlled to a low level to release the reset of the photoelectric converter PD is the time of the start of a charge accumulation period in the photoelectric converter PD, that is, the time of the start of exposure. Such an operation of simultaneously resetting the photoelectric converters PD of the pixels P on the plurality of rows as described above is referred to as a global shutter operation.

The timing of the end of exposure in global shutter driving is the timing of the end of transfer of charges accumulated in the photoelectric converter PD to the charge holding portion MEM. The charge transfer from the photoelectric converter PD to the charge holding portion MEM is performed by supplying the same control signal GS to the second transfer gate signal lines on a plurality of rows on which exposure is simultaneously started. The control signal GS is controlled to a high level to turn on the transfer transistor M6, and thereby charges accumulated in the photoelectric converter PD are transferred to the charge holding portion MEM. Then, the timing when the control signal GS is controlled to the low level to complete the charge transfer from the photoelectric converter PD to the charge holding portion MEM is the time of the end of a charge accumulation period in the photoelectric converter PD, that is, the time of the end of exposure. Such an operation of simultaneously transferring charges from the photoelectric converters PD to the charge holding portions MEM in the pixels P on a plurality of rows as described above is referred to as a global memory transfer operation.

In the pixels P on which a global memory transfer operation is performed, prior to the global memory transfer operation, the charge holding portions MEM are reset in advance. Before the global memory transfer operation, the control signals PRES and the control signals PTX on a plurality of rows on which the global memory transfer operation is performed are controlled to the high level to turn on the FD reset transistors M2 and the transfer transistor M1 at the same time. Thereby, the charge holding portions MEM are connected to the power supply node via the transfer transistors M1 and the FD reset transistors M2, and the charge holding portions MEM are reset to the potential corresponding to the voltage VCC. Such an operation of simultaneously resetting the charge holding portions MEM of the pixels P on the plurality of rows as described above is referred to as a global memory reset operation.

In a readout operation, the control signal PRES(n) is controlled to a low level and the control signals PSEL(n) and PTX(n) are controlled to a high level to turn on the transfer transistor M1 and the select transistor M4 at the same time while the FD reset transistor M2 is in an off-state. Thereby, charges held in the charge holding portion MEM are transferred to the floating diffusion FD. With charges being transferred from the charge holding portion MEM to the floating diffusion FD, the floating diffusion FD has the potential corresponding to the amount of the transferred charges. Thereby, the amplifier transistor M3 outputs a pixel signal corresponding to the potential of the floating diffusion FD to the output line 22 via the select transistor M4. Readout operations in global shutter driving are performed sequentially on a row-by-row basis in the same manner as in the case of rolling shutter driving. The readout operation includes charge transfer of transferring charges generated in the photoelectric converter PD to the charge holding portion MEM and is an operation of reading out a pixel signal based on charges generated in the photoelectric converter PD.

As discussed above, with the exposure start timing and the exposure end timing in the pixels P on the plurality of rows being the same, respectively, the global shutter operation can be realized.

FIG. 9 is a timing chart illustrating an outline of the operation of the entire pixel unit 10. FIG. 9 illustrates a drive example in which data on one row is read out for each input of the horizontal synchronization signal. It is assumed here that the pixel unit 10 has a layout as illustrated in FIG. 3, as with the first embodiment.

The upper part in FIG. 9 illustrates timings of the horizontal synchronization signal, the readout scan start signal 1, the readout scan start signal 2, a global shutter control signal 1, a global shutter control signal 2, a global memory transfer signal 1, and a global memory transfer signal 2. These control signals are the same as those in the case of the first embodiment.

The lower part in FIG. 9 illustrates an outline of the operation corresponding to the signals illustrated in the upper part. Rectangular block groups denoted as "global shutter", "global memory transfer", and "readout scan" correspond to "global shutter operation", "global memory transfer operation", and "readout operation" illustrated in FIG. 8, respectively.

In global shutter driving, exposure is simultaneously started by a global shutter operation and the exposure is simultaneously ends by a global memory transfer on a plurality of rows included in the regions of the same exposure time, as illustrated in FIG. 9. That is, the global shutter operation and the global memory transfer are performed on a plurality of rows included in the reference region 18a and the imaging region 14a in which the exposure time is the exposure time 1. Further, the global shutter operation and the global memory transfer are performed on a plurality of rows included in the reference region 18b and the imaging region 14b in which the exposure time is the exposure time 2 that is different from the exposure time 1.

A readout scan is started after a global memory transfer and performed sequentially on a row-by-row basis regardless of exposure time. Note that, while the readout scan of the reference region 18b and the imaging region 14b is performed after the readout scan of the reference region 18a and the imaging region 14a is performed in the timing chart illustrated in FIG. 9, the order of the readout scans may be opposite.

In the drive example illustrated in FIG. 9, the shutter operation and the memory transfer operation are globally performed on the row in the reference region 18a and the row in the imaging region 14a that are driven in the same condition, and the readout scan is continuously performed. Further, the shutter operation and the memory transfer operation are globally performed on the row in the reference region 18b and the row in the imaging region 14b that are driven in the same condition, and the readout scan is continuously performed. It is therefore possible to simplify switching of control between regions and prevent the configuration of the vertical scanning unit 30 from being complex. For example, the configuration illustrated in FIG. 6 described in the first embodiment can be applied to the control unit 70 and the vertical scanning unit 30.

Note that, while the case where only a single row is read out during one horizontal period is illustrated in the timing chart in FIG. 9, the number of rows read out during one horizontal period is not necessarily required to be one. In global shutter driving, it is sufficient to increase the number of rows to be selected as readout rows in a certain horizontal period, which will not affect the global shutter operation or the global memory transfer operation.

As described above, according to the present embodiment, appropriate offset correction can be performed even when the exposure time is different among a plurality of imaging regions.

Third Embodiment

Figure 10:
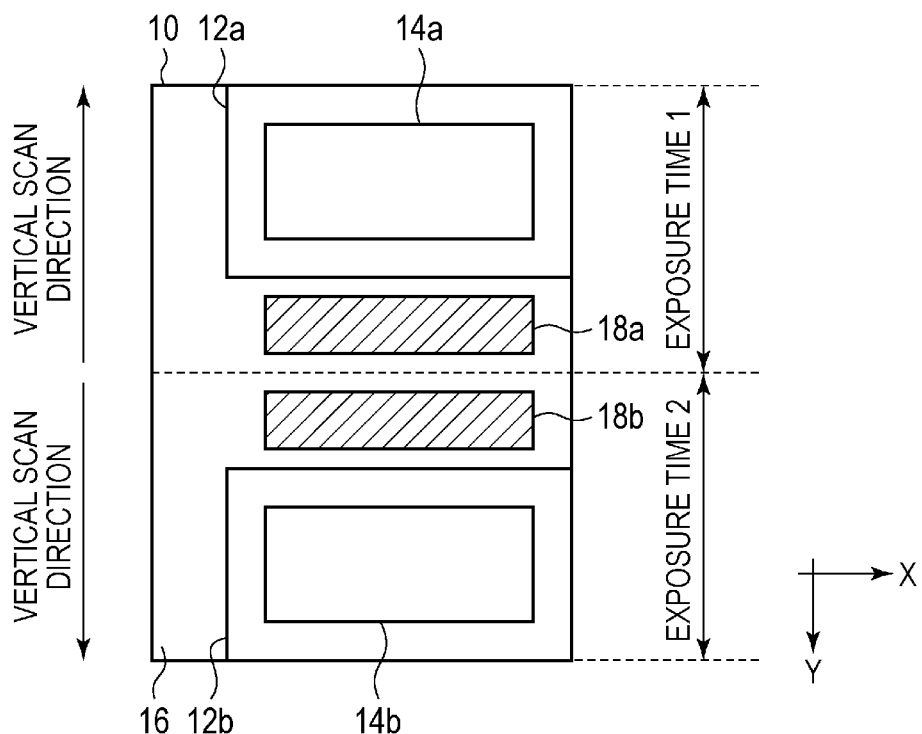
FIG. 10 is a block diagram illustrating a configuration example of a pixel unit in an imaging device according to a third embodiment of the present invention.
Figure 11:
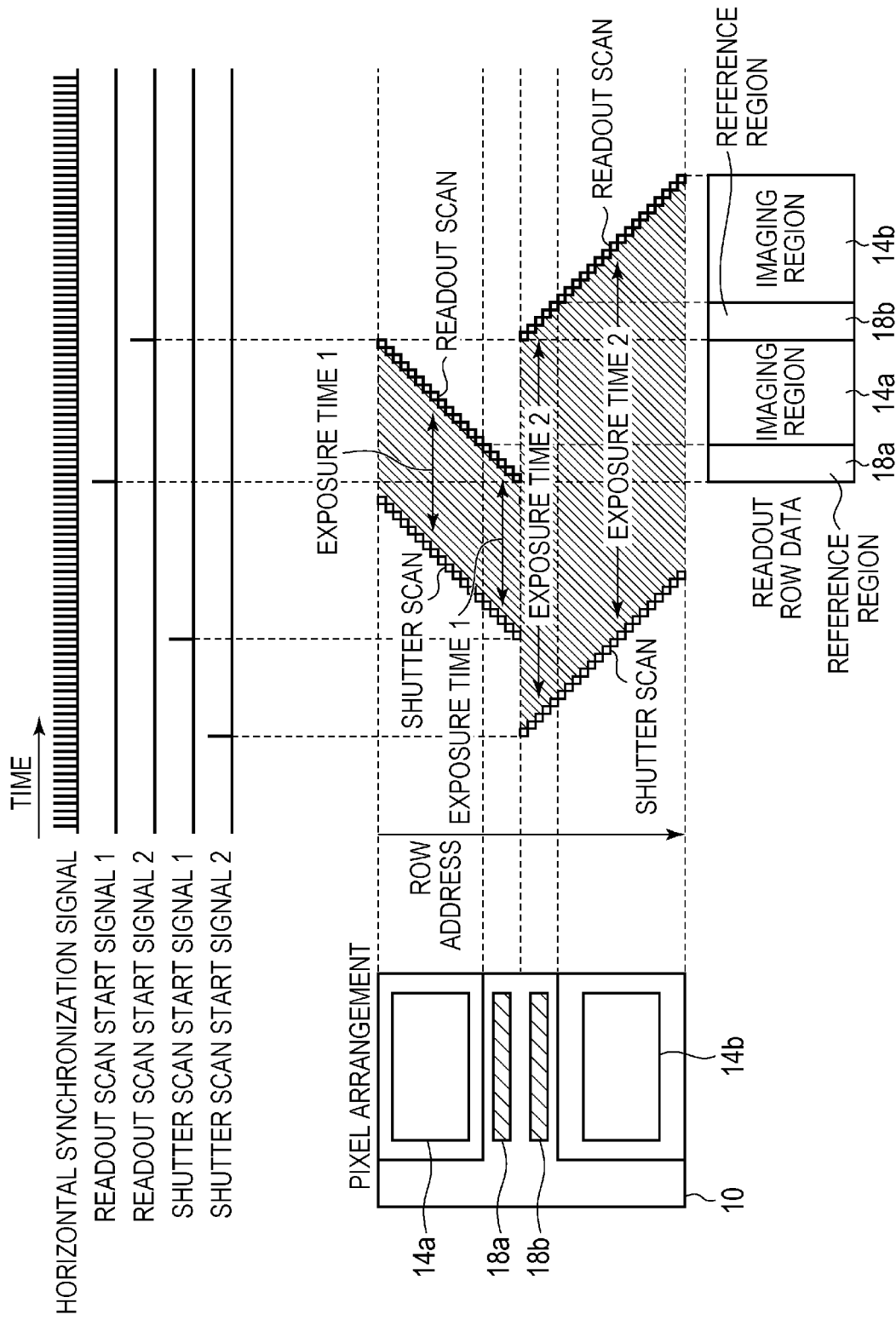
FIG. 11 is a timing chart illustrating a method of driving the imaging device according to the third embodiment of the present invention.

An imaging device and a method of driving the same according to a third embodiment of the present invention will be described with reference to FIG. 10 and FIG. 11. FIG. 10 is a block diagram illustrating a configuration example of a pixel unit in the imaging device according to the present embodiment. FIG. 11 is a timing chart illustrating the method of driving the imaging device according to the present embodiment. The same components as those of the imaging device of the first and second embodiments will be labeled with the same references, and the description will be omitted or simplified.

In the imaging device according to the present embodiment, the basic configuration is the same as that of the imaging device in the first embodiment except the region setting in the pixel unit 10. For example, the pixel P is formed of the circuit illustrated in FIG. 2. In the present embodiment, it is assumed that an imaging device that performs rolling shutter driving is employed.

In the pixel unit 10 of the imaging device according to the present embodiment, the reference region 18a is arranged not in the upper part of the effective pixel region 12a but between the effective pixel region 12a and the reference region 18b, as illustrated in FIG. 10. That is, the effective pixel region 12a, the reference region 18a, the reference region 18b, and the effective pixel region 12b are arranged in this order in the column direction. The effective pixel region 12a, the reference region 18a, the reference region 18b, and the effective pixel region 12b are arranged on the different rows. Note that the reference region 18a may be in contact with the effective pixel region 12a and/or the reference region 18b. Further, the reference region 18b may be in contact with the reference region 18a and/or the effective pixel region 12b.

Also in the region setting of the pixel unit 10 in the imaging device according to the present embodiment, the reference region 18a is adjacent to the imaging region 14a, and the reference region 18b is adjacent to the imaging region 14b. Therefore, also in the present embodiment, an appropriate offset value can be acquired for each of the imaging regions 14a and 14b of different exposure time.

Further, when a focus detection device is configured by using an area sensor in which the pixels P are two-dimensionally arranged as illustrated in FIG. 1, the positions of the plurality of imaging regions are fixed by the configuration of an optical system, and no light enters regions other than the imaging regions. In such a case, a region between imaging regions may be light-shielded to form an OB region, and this OB region can be used as a reference region used for acquiring an offset value. With such a configuration, since no OB region may be arranged in the upper region or the lower region that are not interposed between the imaging regions 14a and 14b, the area of the pixel unit 10 can be reduced, and thus the size of the imaging device can be reduced.

FIG. 11 is a timing chart illustrating an outline of the operation in the entire pixel unit 10. FIG. 11 illustrates a drive example in which data on one row is read out for each input of the horizontal synchronization signal. The upper part in FIG. 11 illustrates timings of the horizontal synchronization signal, the readout scan start signal 1, the readout scan start signal 2, the shutter scan start signal 1, and the shutter scan start signal 2. These control signals are the same as those in the case of the first embodiment. The lower part in FIG. 11 illustrates an outline of the operation corresponding to the signals illustrated in the upper part. Rectangular block groups denoted as "shutter scan" and "readout scan" correspond to "shutter operation" and "readout operation" illustrated in FIG. 4, respectively.

In the imaging device of the present embodiment, driving in a rolling shutter scheme as with the imaging device of the first embodiment is performed, as illustrated in FIG. 11.

In the drive example in FIG. 11, the imaging region 14a is controlled with exposure time 1, and the imaging region 14b is controlled with exposure time 2 that is independent of the exposure time 1. In the same manner as in the case of the first embodiment, the reference region 18a corresponding to the imaging region 14a is controlled in the same condition as for the imaging region 14a (corresponding to the exposure time 1). Further, the reference region 18b corresponding to the imaging region 14b is controlled in the same condition as for the imaging region 14b (corresponding to the exposure time 2).

In the drive example in FIG. 11, the direction of a vertical scan is controlled from the reference region 18 to the imaging region 14 for each region of different exposure time. That is, in the reference region 18a and the imaging region 14a set to the exposure time 1, the shutter scan and the readout scan are performed in the direction in which the row address decreases. Further, in the reference region 18b and the imaging region 14b set to the exposure time 2, the shutter scan and the readout scan are performed in the direction in which the row address increases. With such a configuration, the row on which readout is last performed in the reference region 18 can be adjacent to the row on which readout is first performed in the imaging region 14 for each region of different exposure time, and occurrence of an offset error due to a difference in the physical distance can be prevented.

Note that, while readout scans of the reference region 18b and the imaging region 14b are performed after readout scans of the reference region 18a and the imaging region 14a are performed in the timing chart illustrated in FIG. 11, the order of readout scans may be opposite.

As described above, according to the present embodiment, appropriate offset correction can be performed even when the exposure time is different among a plurality of imaging regions.

Fourth Embodiment

Figure 12:
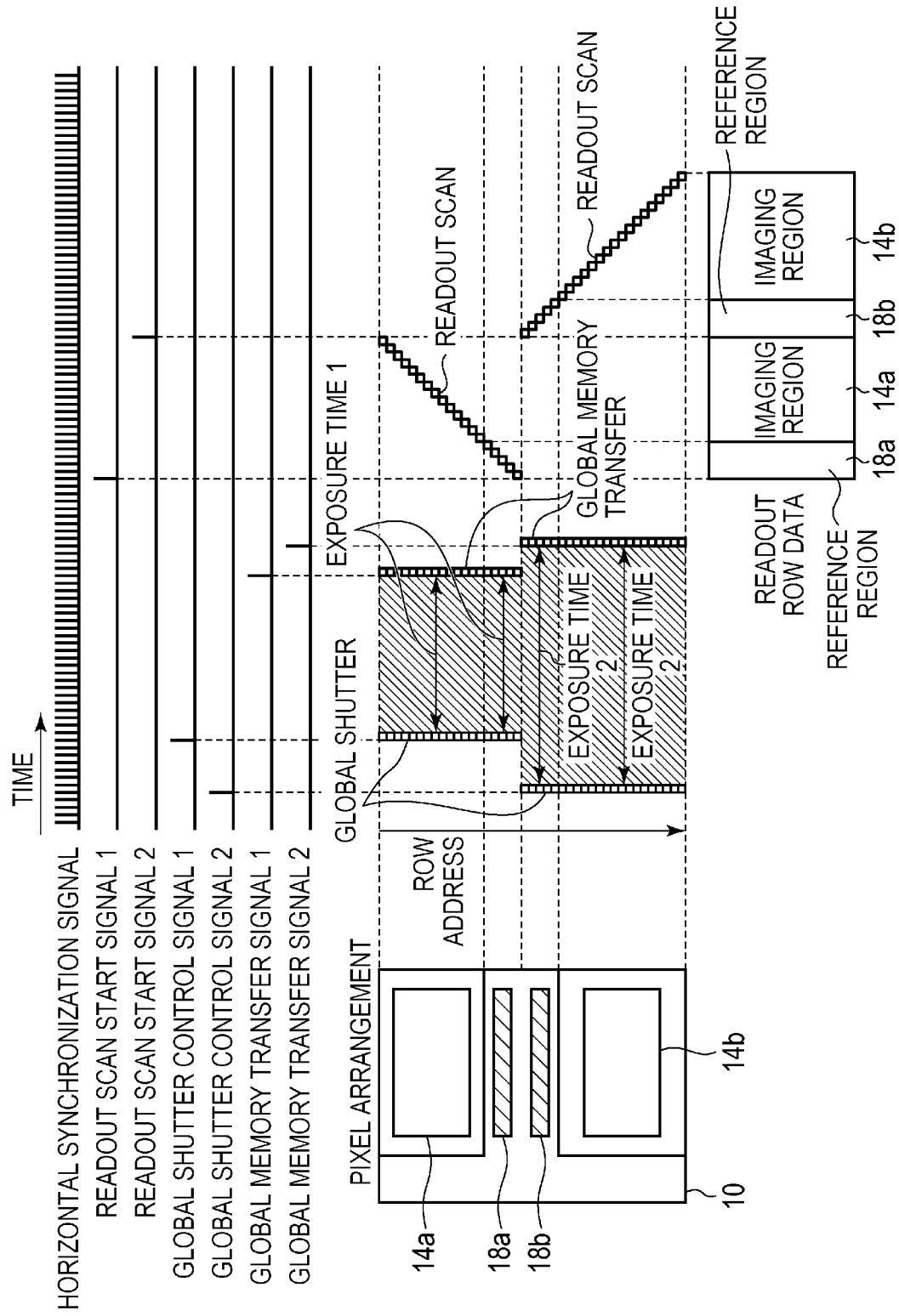
FIG. 12 is a timing chart illustrating a method of driving an imaging device according to a fourth embodiment of the present invention.

An imaging device and a method of driving the same according to a fourth embodiment of the present invention will be described with reference to FIG. 12. FIG. 12 is a timing chart illustrating the method of driving the imaging device according to the present embodiment. The same components as those of the imaging device of the first to third embodiments will be labeled with the same references, and the description will be omitted or simplified.

In the imaging device according to the present embodiment, the basic configuration is the same as that of the imaging device in the second embodiment except the region setting in the pixel unit 10. For example, the pixel P is formed of the circuit illustrated in FIG. 7. In the present embodiment, it is assumed that an imaging device that performs global shutter operation driving is employed.

In the pixel unit 10 of the imaging device according to the present embodiment, the reference region 18a is arranged not in the upper part of the effective pixel region 12a but between the effective pixel region 12a and the reference region 18b as with the third embodiment (see FIG. 10). That is, the effective pixel region 12a, the reference region 18a, the reference region 18b, and the effective pixel region 12b are arranged in this order in the column direction. The effective pixel region 12a, the reference region 18a, the reference region 18b, and the effective pixel region 12b are arranged on the different rows.

Also in the region setting of the pixel unit 10 in the imaging device according to the present embodiment, the reference region 18a is adjacent to the imaging region 14a, and the reference region 18b is adjacent to the imaging region 14b. Therefore, also in the present embodiment, an appropriate offset value can be acquired for each of the imaging regions 14a and 14b of different exposure time.

Further, when a focus detection device is configured by using an area sensor in which the pixels P are two-dimensionally arranged as illustrated in FIG. 1, the positions of the plurality of imaging regions are fixed by the configuration of an optical system, and no light enters regions other than the imaging regions. In such a case, a region between imaging regions may be light-shielded to form an OB region, and this OB region can be used as a reference region used for acquiring an offset value. With such a configuration, since no OB region may be arranged in the upper region or the lower region that are not interposed between the imaging regions 14a and 14b, the area of the pixel unit 10 can be reduced, and thus the size of the imaging device can be reduced.

FIG. 12 is a timing chart illustrating an outline of the operation in the entire pixel unit 10. FIG. 12 illustrates a drive example in which data on one row is read out for each input of the horizontal synchronization signal. The upper part in FIG. 12 illustrates timings of the horizontal synchronization signal, the readout scan start signal 1, the readout scan start signal 2, the global shutter control signal 1, the global shutter control signal 2, the global memory transfer signal 1, and the global memory transfer signal 2. These control signals are the same as those in the case of the second embodiment. The lower part in FIG. 12 illustrates an outline of the operation corresponding to the signals illustrated in the upper part. Rectangular block groups denoted as "global shutter", "global memory transfer", and "readout scan" correspond to "global shutter operation", "global memory transfer operation", and "readout operation" illustrated in FIG. 8, respectively.

In the imaging device of the present embodiment, driving in a global shutter scheme as with the imaging device of the second embodiment is performed, as illustrated in FIG. 12.

A global shutter operation and a global memory transfer operation are performed at independent timings for respective regions of different exposure time in the same manner as in the case of the second embodiment. Further, to prevent an offset error due to a difference in the physical distance from occurring, the readout scan is performed in the direction in which the row address decreases in the reference region 18a and the imaging region 14a set to the exposure time 1 in the same manner as in the case of the third embodiment. Further, in the reference region 18b and the imaging region 14b set to the exposure time 2, the readout scan is performed in the direction in which the row address increases.

Note that, while the readout scan of the reference region 18b and the imaging region 14b is performed after the readout scan of the reference region 18a and the imaging region 14a is performed in the timing chart illustrated in FIG. 12, the order of the readout scans may be opposite.

As described above, according to the present embodiment, appropriate offset correction can be performed even when the exposure time is different among a plurality of imaging regions.

Fifth Embodiment

Figure 13:
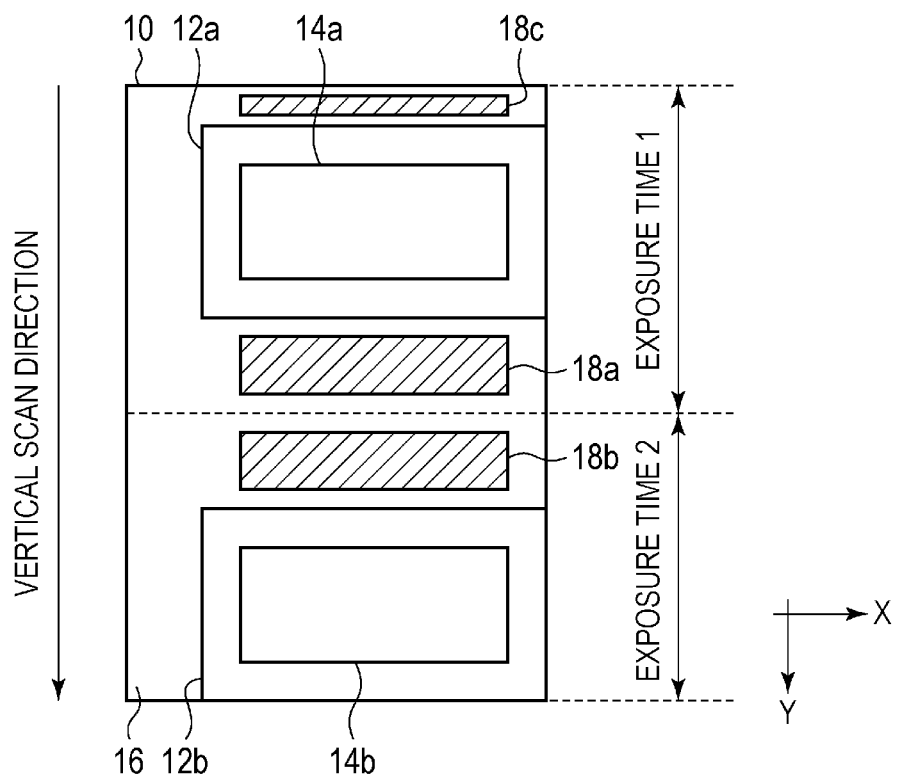
FIG. 13 is a block diagram illustrating a configuration example of a pixel unit in an imaging device according to a fifth embodiment of the present invention.
Figure 14:
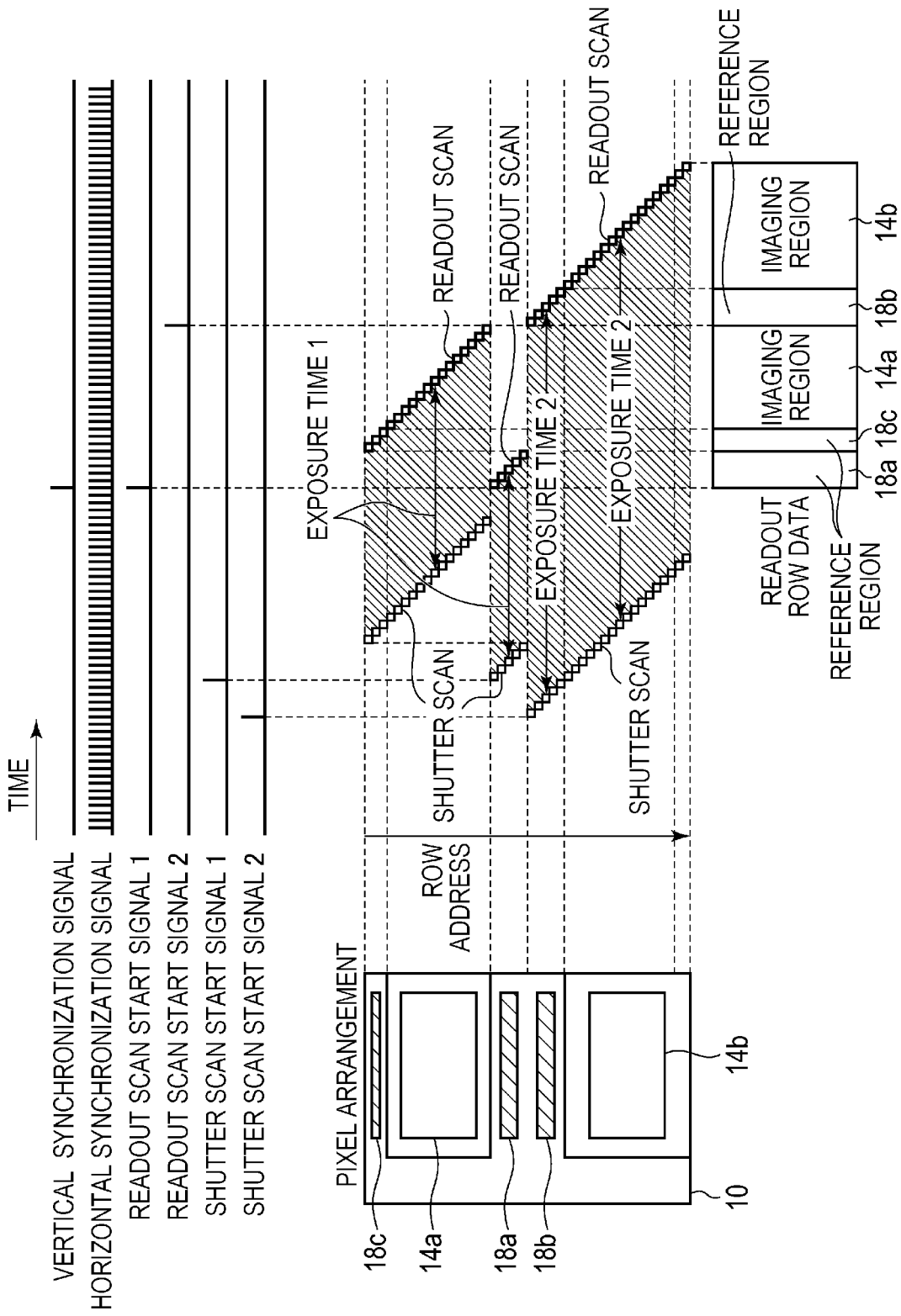
FIG. 14 is a timing chart illustrating a method of driving an imaging device according to a fifth embodiment of the present invention.

An imaging device and a method of driving the same according to a fifth embodiment of the present invention will be described with reference to FIG. 13 and FIG. 14. FIG. 13 is a block diagram illustrating a configuration example of a pixel unit in the imaging device according to the present embodiment. FIG. 14 is a timing chart illustrating a method of driving the imaging device according to the present embodiment. The same components as those of the imaging device of the first to fourth embodiments will be labeled with the same references, and the description will be omitted or simplified.

In the imaging device according to the present embodiment, the basic configuration is the same as that of the imaging device in the first embodiment except the region setting in the pixel unit 10. For example, the pixel P is formed of the circuit illustrated in FIG. 2. In the present embodiment, it is assumed that an imaging device that performs rolling shutter driving is employed.

In the imaging device according to the present embodiment, the pixel unit 10 includes the imaging region 14a arranged in the effective pixel region 12a, the imaging region 14b arranged in the effective pixel region 12b, and reference regions 18a, 18b, and 18c arranged in the OB region 16, as illustrated in FIG. 13. The difference from the imaging device of the third embodiment illustrated in FIG. 10 is that the reference region 18c is further provided in the OB region 16. The reference region 18c is arranged adjacent to the effective pixel region 12a in the column direction so as to interpose the effective pixel region 12a between the reference region 18a and the reference region 18c. That is, the reference region 18c, the effective pixel region 12a, the reference region 18a, the reference region 18b, and the effective pixel region 12b are arranged in this order in the column direction. The reference region 18c, the effective pixel region 12a, the reference region 18a, the reference region 18b, and the effective pixel region 12b are arranged on different rows. Note that the reference region 18c may be in contact with the effective pixel region 12a.

The reference region 18a and the reference region 18c are regions in which the pixels P used for calculating an offset component superimposed on the pixel signal acquired from the pixels P arranged in the imaging region 14a are arranged. Further, the reference region 18b is a region in which the pixels P used for calculating an offset component superimposed on the pixel signal acquired from the pixels P arranged in the imaging region 14b are arranged.

FIG. 14 is a timing chart illustrating an outline of the operation in the entire pixel unit 10. FIG. 14 illustrates a drive example in which data on one row is read out for each input of the horizontal synchronization signal. The upper part in FIG. 14 illustrates timings of the vertical synchronization signal, the horizontal synchronization signal, the readout scan start signal 1, the readout scan start signal 2, the shutter scan start signal 1, and the shutter scan start signal 2. These control signals are the same as those in the case of the first embodiment. The lower part in FIG. 14 illustrates an outline of the operation corresponding to the signals illustrated in the upper part. Rectangular block groups denoted as "shutter scan" and "readout scan" correspond to "shutter operation" and "readout operation" illustrated in FIG. 4, respectively.

In the imaging device of the present embodiment, driving in a rolling shutter scheme as with the imaging device of the first embodiment is performed, as illustrated in FIG. 14.

In the drive example in FIG. 14, the imaging region 14a is controlled with exposure time 1, and the imaging region 14b is controlled with exposure time 2 that is independent of the exposure time 1. In the same manner as in the case of the first embodiment, the reference regions 18a and 18c corresponding to the imaging region 14a is controlled in the same condition as that for the imaging region 14a (corresponding to the exposure time 1). Further, the reference region 18b corresponding to the imaging region 14b is controlled in the same condition as for the imaging region 14b (corresponding to the exposure time 2).

When driving in which the direction of the shutter scan and the readout scan is switched on a region basis as illustrated in the third embodiment cannot be performed, both the reference region 18a and the imaging region 14a will be scanned in the direction in which the row address increases. When a scan of the imaging region 14a is performed after a scan of the reference region 18a, however, the last scan row in the reference region 18a will not be adjacent to the first scan row in the imaging region 14a. Thus, such drive may cause an offset error due to a difference in the arranged place of the pixels P.

Accordingly, in a drive example in FIG. 14, readout of the reference region 18c is performed after the reference region 18a is read out and before readout of the imaging region 14a is started, and thereby the last scan row in the reference region 18c is adjacent to the first scan row in the imaging region 14a. With such a configuration, an offset error due to a difference in the arranged place between the reference region 18a and the imaging region 14a can be reduced. The reference region 18c may include any number of pixels (the number of rows) that can substantially cancel an offset error.

As described above, according to the present embodiment, appropriate offset correction can be performed even when the exposure time is different among a plurality of imaging regions.

Sixth Embodiment

Figure 15:
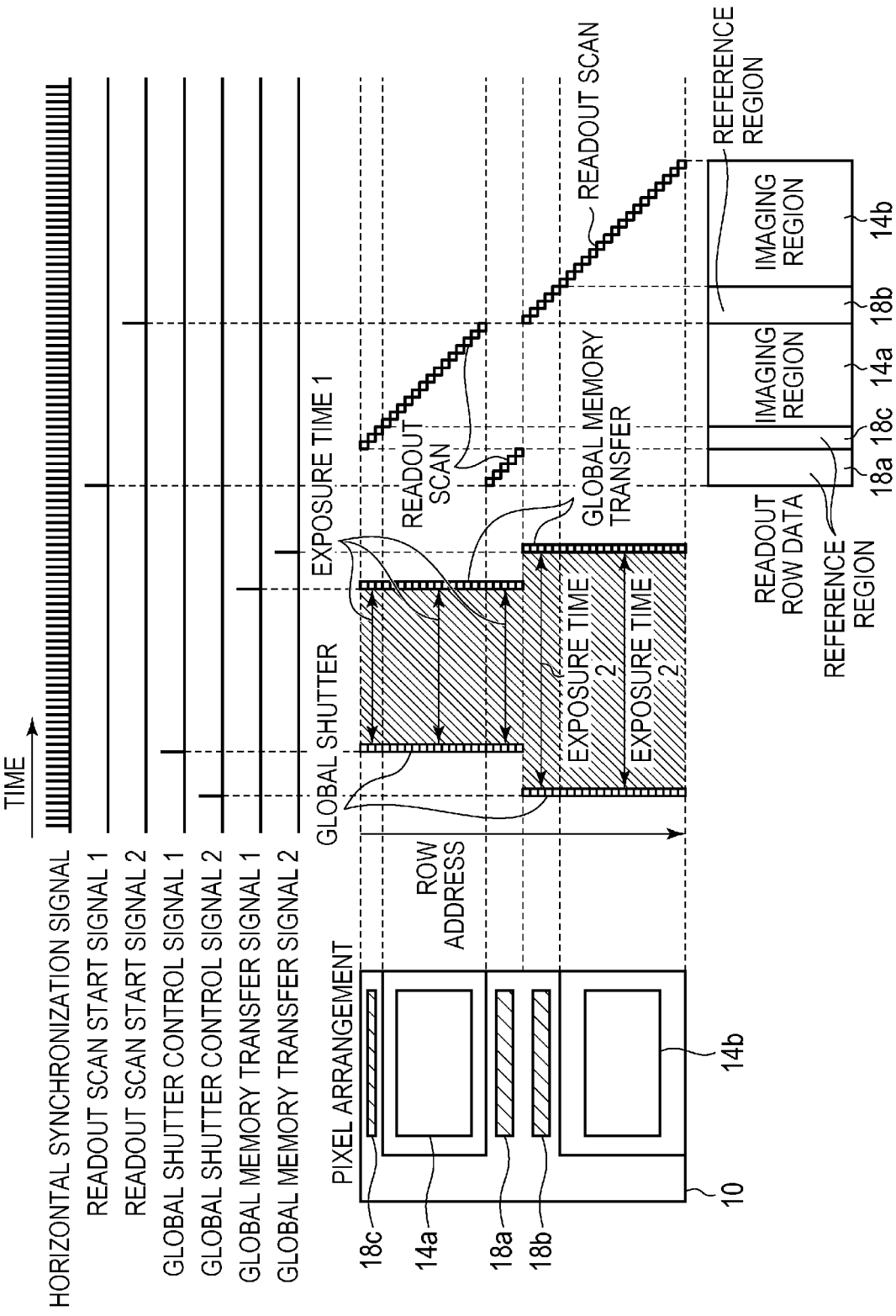
FIG. 15 is a timing chart illustrating a method of driving an imaging device according to a sixth embodiment of the present invention.

An imaging device and a method of driving the same according to a sixth embodiment of the present invention will be described by using FIG. 15. FIG. 15 is a timing chart illustrating the method of driving the imaging device according to the present embodiment. The same components as those of the imaging device of the first to fifth embodiments will be labeled with the same references, and the description will be omitted or simplified.

In the imaging device according to the present embodiment, the basic configuration is the same as that of the imaging device in the second embodiment except the region setting in the pixel unit 10. For example, the pixel P is formed of the circuit illustrated in FIG. 7. In the present embodiment, it is assumed that an imaging device that performs global shutter operation driving is employed.

The pixel unit 10 of the imaging device according to the present embodiment further includes the reference region 18c arranged adjacent to the effective pixel region 12a in the column direction so as to interpose the effective pixel region 12a between the reference region 18a and the reference region 18c as with the fifth embodiment. That is, the reference region 18c, the effective pixel region 12a, the reference region 18a, the reference region 18b, and the effective pixel region 12b are arranged in this order in the column direction. The reference region 18c, the effective pixel region 12a, the reference region 18a, the reference region 18b, and the effective pixel region 12b are arranged on different rows. Note that the reference region 18c may be in contact with the effective pixel region 12a.

FIG. 15 is a timing chart illustrating an outline of the operation in the entire pixel unit 10. FIG. 15 illustrates a drive example in which data on one row is read out for each input of the horizontal synchronization signal. The upper part in FIG. 15 illustrates timings of the horizontal synchronization signal, the readout scan start signal 1, the readout scan start signal 2, the global shutter control signal 1, the global shutter control signal 2, the global memory transfer signal 1, and the global memory transfer signal 2. These control signals are the same as those in the case of the second embodiment. The lower part in FIG. 15 illustrates an outline of the operation corresponding to the signals illustrated in the upper part. Rectangular block groups denoted as "global shutter", "global memory transfer", and "readout scan" correspond to "global shutter operation", "global memory transfer operation", and "readout operation" illustrated in FIG. 8, respectively.

In the imaging device of the present embodiment, driving in a global shutter scheme as with the imaging device of the second embodiment is performed, as illustrated in FIG. 15.

A global shutter operation and a global memory transfer operation are performed at independent timings for respective regions of different exposure time as the same manner as in the case of the second embodiment. Further, readout scans of the reference regions 18a and 18c and the imaging region 14a set to the exposure time 1 are performed in the order of the reference region 18a, the reference region 18c, and the imaging region 14a in the same manner as in the case of the fifth embodiment. This can prevent occurrence of an offset error due to a difference in the arranged place of the pixels P between the reference region 18c and the imaging region 14a. Further, in the reference region 18a and the imaging region 14a set to the exposure time 1, the readout scan is performed in the direction in which the row address increases as with the case of the fifth embodiment.

Note that, while readout scans of the reference region 18b and the imaging region 14b are performed after readout scans of the reference regions 18a and 18c and the imaging region 14a are performed in the timing chart illustrated in FIG. 15, the order of the readout scans may be opposite.

As described above, according to the present embodiment, appropriate offset correction can be performed even when the exposure time is different among a plurality of imaging regions.

Seventh Embodiment

Figure 16:
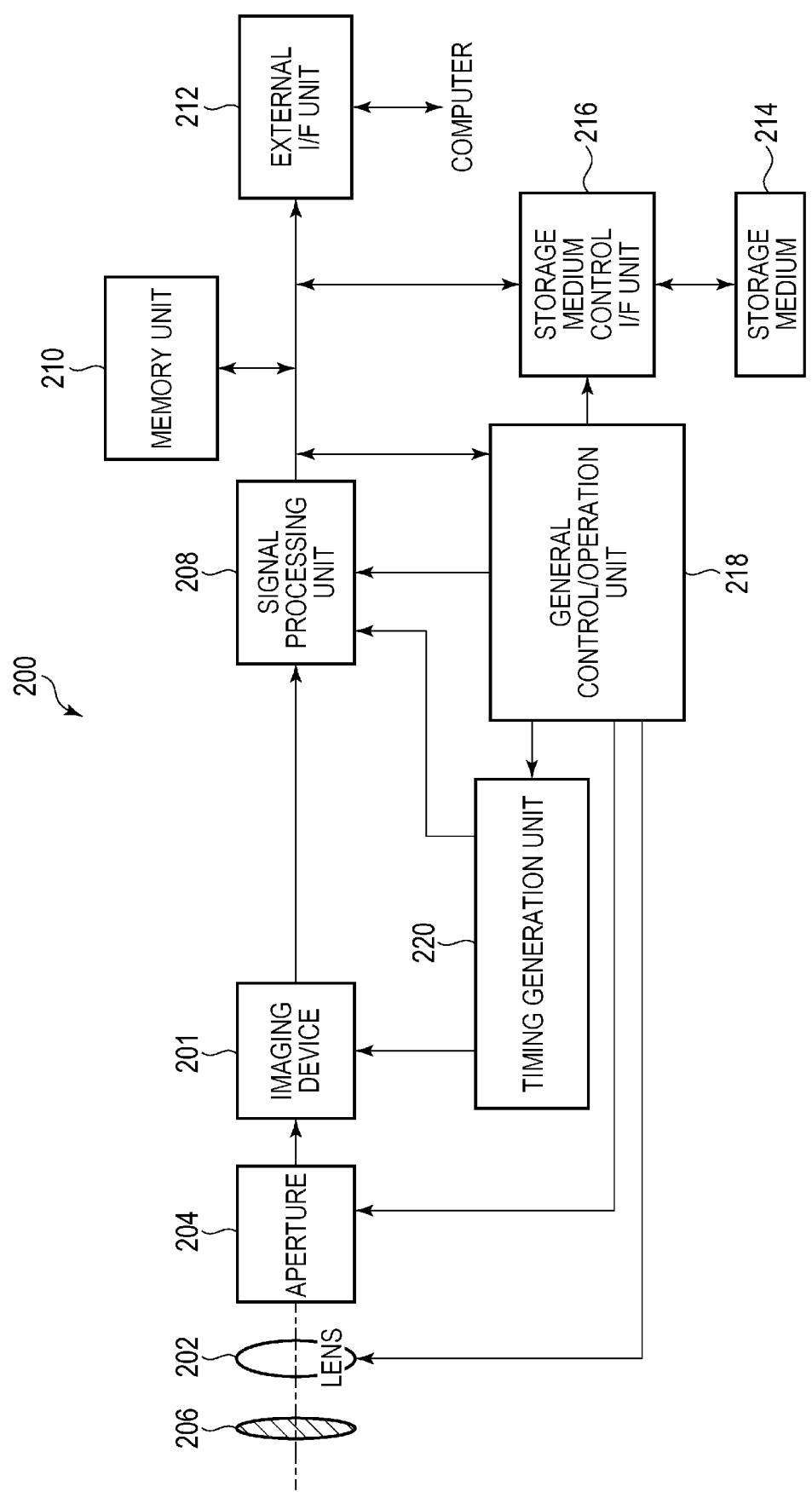
FIG. 16 is a block diagram illustrating a general configuration of an imaging system according to a seventh embodiment.

An imaging system according to a seventh embodiment of the present invention will be described by using FIG. 16. The same components as those of the imaging device of the first to sixth embodiments will be labeled with the same references, and the description will be omitted or simplified. FIG. 16 is a block diagram illustrating a general configuration of the imaging system according to the present embodiment.

The imaging device 100 described in the above first to sixth embodiments can be applied to various imaging systems. An example of the applicable imaging system may be a digital still camera, a digital camcorder, a surveillance camera, a copy machine, a fax machine, a mobile phone, an on-vehicle camera, an observation satellite, and the like. Further, a camera module having an optical system, such as a lens, and an imaging device may be included in the imaging system. FIG. 16 illustrates a block diagram of a digital still camera as an example of the above.

The imaging system 200 illustrated as an example in FIG. 16 includes an imaging device 201, a lens 202 that captures an optical image of an object onto the imaging device 201, an aperture 204 for changing a light amount passing through the lens 202, and a barrier 206 for protecting the lens 202. The lens 202 and the aperture 204 form an optical system that converges a light onto the imaging device 201. The imaging device 201 is the imaging device 100 described in the first to sixth embodiments and converts an optical image captured by the lens 202 into image data.

The imaging system 200 further includes a signal processing unit 208 that processes an output signal output from the imaging device 201. The signal processing unit 208 performs AD conversion that converts an analog signal output from the imaging device 201 into a digital signal. Further, the signal processing unit 208 performs other operations of performing various correction or compression if necessary and outputting image data. The offset correction process to subtract output values of the pixels P arranged in the reference region 18 from output values of the pixels P arranged in the imaging region 14 may be performed in the signal processing unit 208. An AD conversion unit that is a part of the signal processing unit 208 may be formed on the semiconductor substrate on which the imaging device 201 is provided or may be formed on a different semiconductor substrate from the imaging device 201. Further, the imaging device 201 and the signal processing unit 208 may be formed on the same semiconductor substrate.

The imaging system 200 further includes a memory unit 210 for temporarily storing image data therein and an external interface unit (external I/F unit) 212 for communicating with an external computer or the like. The imaging system 200 further includes a storage medium 214 such as a semiconductor memory for performing storage or readout of image pickup data and a storage medium control interface unit (storage medium control I/F unit) 216 for performing storage or readout on the storage medium 214. Note that the storage medium 214 may be embedded in the imaging system 200 or may be removable.

The imaging system 200 further includes a general control/operation unit 218 that controls various operations and the entire digital still camera and a timing generation unit 220 that outputs various timing signals to the imaging device 201 and the signal processing unit 208. Here, the timing signal or the like may be input from the outside, and the imaging system 200 may include at least the imaging device 201 and the signal processing unit 208 that processes an output signal output from the imaging device 201.

The imaging device 201 outputs an imaging signal to the signal processing unit 208. The signal processing unit 208 performs predetermined signal processing on an imaging signal output from the imaging device 201 and outputs image data. The signal processing unit 208 uses an imaging signal to generate an image.

Application of the imaging device 100 of any of the first to sixth embodiments can realize an imaging system that can acquire a good quality image with less noise.

Eighth Embodiment

An imaging system and a movable object according to an eighth embodiment of the present invention will be described by using FIG. 17A and FIG. 17B.

Figure 17A:
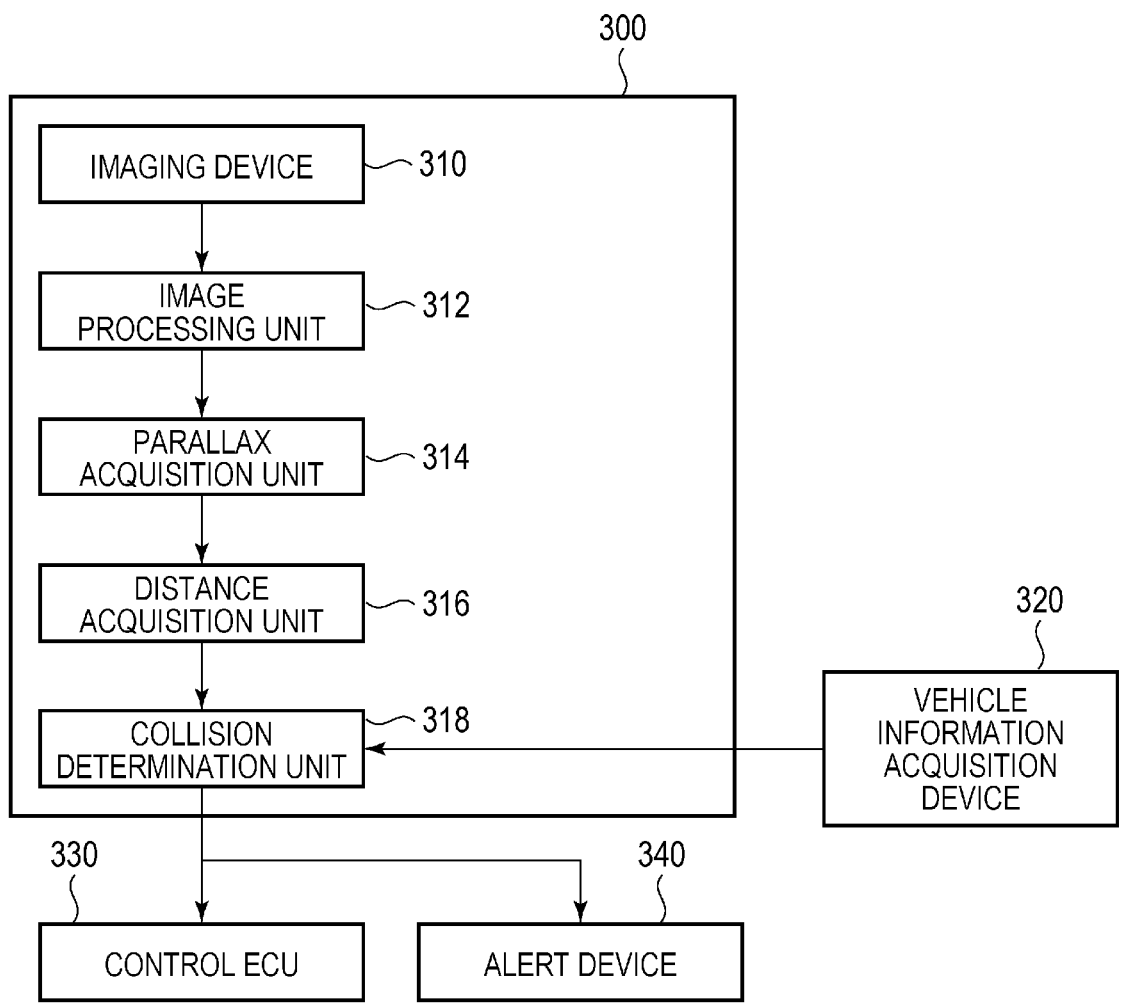
FIG. 17A is a diagram illustrating a configuration example of an imaging system according to an eighth embodiment.
Figure 17B:
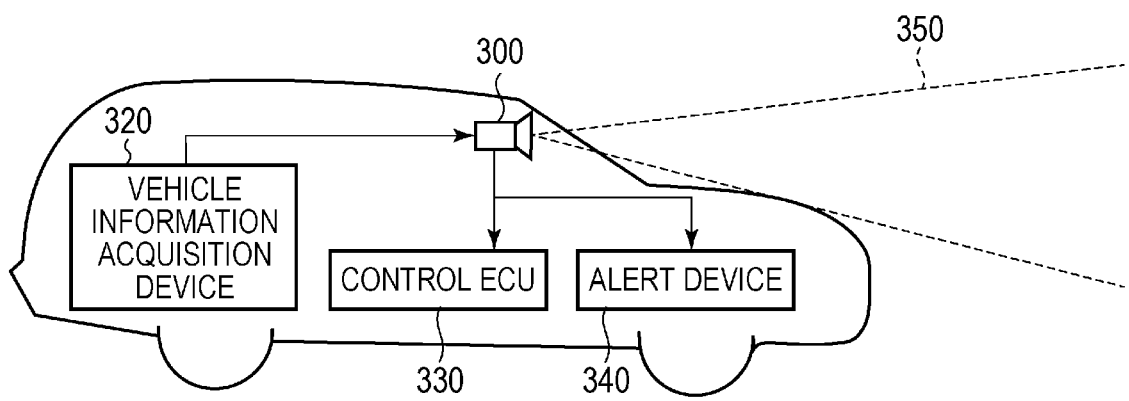
FIG. 17B is a diagram illustrating a configuration example of a movable object according to the eighth embodiment.

FIG. 17A is a diagram illustrating a configuration of an imaging system according to the present embodiment. FIG. 17B is a diagram illustrating a configuration of a movable object according to the present embodiment.

FIG. 17A illustrates an example of an imaging system related to an on-vehicle camera. The imaging system 300 includes an imaging device 310. The imaging device 310 is any of the imaging devices 100 described in any of the above first to sixth embodiments. The imaging system 300 includes an image processing unit 312 that performs image processing on a plurality of image data acquired by the imaging device 310 and a parallax acquisition unit 314 that calculates a parallax (a phase difference of parallax images) from the plurality of image data acquired by the imaging system 300. Further, the imaging system 300 includes a distance acquisition unit 316 that calculates a distance to an object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to an object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like or may be implemented by a combination thereof.

The imaging system 300 is connected to a vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 17B illustrates the imaging system in a case of capturing a front area of a vehicle (a capturing region 350). The vehicle information acquisition device 320 transmits instructions to the imaging system 300 or imaging device 310. Such a configuration can further improve the ranging accuracy.

Although an example of control for avoiding a collision to another vehicle has been described in the description above, it is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

Further, while the case where the exposure time is different between the imaging regions 14a and 14b has been described in the above embodiments, the exposure time may be the same between the imaging regions 14a and 14b.

Further, while the number of imaging regions 14 of different exposure time is two in the embodiments described above, the number of imaging regions 14 of different exposure time is not limited to two but may be three or more. In such a case, the exposure time may be set in accordance with the number of imaging regions of different exposure time, independent timing control units and vertical scanning circuits may be provided in association with the exposure time setting, and readout scans and shutter scans may be controlled for respective imaging regions of different exposure time.

Further, the imaging systems illustrated in the embodiments described above are examples of an imaging system to which the imaging device of the present invention may be applied, the imaging system to which the solid state imaging device of the present invention can be applied is not limited to the configuration illustrated in FIG. 16 and FIG. 17A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-240694, filed Dec. 15, 2017 which is hereby incorporated by reference herein in its entirety.

What is claimed is:
1. An imaging device comprising:
a pixel unit including a plurality of pixels arranged over a plurality of rows, wherein each of the plurality of pixels includes a photoelectric converter, a holding portion that holds charges generated in the photoelectric converter, an amplifier unit that outputs a pixel signal based on an amount of charges held in the holding portion, and a reset unit that resets the photoelectric converter; and a scanning unit that performs a reset operation of the photoelectric converter of each of the pixels and a readout operation of a pixel signal based on charges generated in the photoelectric converter over the plurality of pixels on the row-by-row basis, the readout operation including charge transfer to transfer charges generated in the photoelectric converter to the holding portion, wherein the plurality of pixels include effective pixels in each of which a light enters the photoelectric converter and optical black pixels in each of which the photoelectric converter is shielded from light, the optical black pixels are arranged on a different row than a row on which the effective pixels are arranged, and the number of the optical black pixels on the different row is greater than the number of the effective pixel on the different row, wherein the pixel unit includes first and second imaging regions in which a plurality of the effective pixels are arranged, respectively, and first and second reference regions in which a plurality of the optical black pixels are arranged, respectively, wherein one of the first reference region and the second reference region is arranged between the first imaging region and the second imaging region, wherein the scanning unit is configured to:
  drive the pixels arranged in the first imaging region and the first reference region in a first condition where a period from a timing when the reset operation ends to a timing when the charge transfer ends is a first length, and
  drive the pixels arranged in the second imaging region and the second reference region in a second condition where a period from a timing when the reset operation ends to a timing when the charge transfer ends is a second length that is longer than the first length.

2. The imaging device according to claim 1, wherein the second reference region is arranged between the first imaging region and the second imaging region, and the first reference region is arranged so as to interpose the first imaging region between the first reference region and the second reference region.

3. The imaging device according to claim 2, wherein the pixel unit further includes a third reference region which is arranged between the first imaging region and the second reference region and in which the optical black pixels driven in the first condition are arranged.

4. The imaging device according to claim 3, wherein the scanning unit is configured to perform the readout operation on a row belonging to the first reference region and a row belonging to the first imaging region after performing the readout operation on a row belonging to the third reference region.

5. The imaging device according to claim 1, wherein the first reference region is arranged between the first imaging region and the second imaging region, and the second reference region is arranged between the first reference region and the second reference region.

6. The imaging device according to claim 1, wherein the scanning unit is further configured to:

perform the readout operation on a row belonging to the first imaging region after performing the readout operation on a row belonging to the first reference region, and perform the readout operation on a row belonging to the second imaging region after performing the readout operation on a row belonging to the second reference region.

7. The imaging device according to claim 6,
wherein a row on which the readout operation is last performed out of rows belonging to the first reference region is adjacent to a row on which the readout operation is first performed out of rows belonging to the first imaging region, and wherein a row on which the readout operation is last performed out of rows belonging to the second reference region is adjacent to a row on which the readout operation is first performed out of rows belonging to the second imaging region.

8. The imaging device according to claim 1, wherein the reset operation and the charge transfer operation on the plurality of rows are performed sequentially on a row-by-row basis in each of the first reference region and the first imaging region and each of the second reference region and the second imaging region.

9. The imaging device according to claim 1,
wherein the holding portion includes a first holding portion to which charges are transferred from the photoelectric converter and a second holding portion to which charges are transferred from the first holding portion, wherein the amplifier unit outputs the pixel signal based on an amount of charges held in the second holding portion, wherein the charge transfer is transfer of charges from the photoelectric converter to the first holding portion, and wherein the scanning unit is further configured to:
  perform the reset operation of the first reference region and the reset operation of the first imaging region simultaneously at a first timing on a plurality of rows belonging to the first reference region and the first imaging region,
  perform the reset operation of the second reference region and the reset operation of the second imaging region simultaneously at a second timing on a plurality of rows belonging to the first reference region and the first imaging region,
  perform the charge transfer of the first reference region and the charge transfer of the first imaging region simultaneously at a third timing on a plurality of rows belonging to the first reference region and the first imaging region, and
  perform the charge transfer of the second reference region and the charge transfer of the second imaging region simultaneously at a fourth timing on a plurality of rows belonging to the second reference region and the second imaging region.

10. The imaging device according to claim 1,
wherein the first imaging region and the first reference region are adjacent to each other, and wherein the second imaging region and the second reference region are adjacent to each other.

11. The imaging device according to claim 1, wherein the scanning unit includes a first scanning circuit that drives, in the first condition, the pixels arranged in the first imaging region and the first reference region and a second scanning circuit that drives, in the second condition, the pixels arranged in the second imaging region and the second reference region.

12. The imaging device according to claim 1 further comprising a signal processing unit that performs a correction process to subtract output values of the pixels arranged in the first reference region from output values of the pixels arranged in the first imaging region and a correction process to subtract output values of the pixels arranged in the second reference region from output values of the pixels arranged in the second imaging region.

13. A method of driving an imaging device including a pixel unit provided with a plurality of pixels arranged over a plurality of rows, wherein each of the plurality of pixels includes a photoelectric converter, a holding portion that holds charges generated in the photoelectric converter, an amplifier unit that outputs a pixel signal based on an amount of charges held in the holding portion, and a reset unit that resets the photoelectric converter, wherein the plurality of pixels include effective pixels in each of which a light enters the photoelectric converter and optical black pixels in each of which the photoelectric converter is shielded from light, the optical black pixels are arranged on a different row than a row on which the effective pixels are arranged, and the number of the optical black pixels on the different row is greater than the number of the effective pixel on the different row, wherein the pixel unit includes first and second imaging regions in which a plurality of the effective pixels are arranged, respectively, and first and second reference regions in which a plurality of the optical black pixels are arranged, respectively, and wherein one of the first reference region and the second reference region is arranged between the first imaging region and the second imaging region, the method comprising:

when performing a reset operation of the photoelectric converter of each of the pixels and a readout operation of a pixel signal based on charges generated in the photoelectric converter over the plurality of pixels on the row-by-row basis, wherein readout operation includes charge transfer to transfer charges generated in the photoelectric converter to the holding portion, driving the pixels arranged in the first imaging region and the first reference region in a first condition where a period from a timing when the reset operation ends to a timing when the charge transfer ends is a first length; and driving the pixels arranged in the second imaging region and the second reference region in a second condition where a period from a timing when the reset operation ends to a timing when the charge transfer ends is a second length that is longer than the first length.

14. The method of driving the imaging device according to claim 13, wherein the readout operation on a row belonging to the first imaging region is performed after the readout operation on a row belonging to the first reference region is performed, and wherein the readout operation on a row belonging to the second imaging region is performed after the readout operation on a row belonging to the second reference region is performed.

15. The method of driving the imaging device according to claim 14, wherein a row on which the readout operation is last performed out of rows belonging to the first reference region is adjacent to a row on which the readout operation is first performed out of rows belonging to the first imaging region, and wherein a row on which the readout operation is last performed out of rows belonging to the second reference region is adjacent to a row on which the readout operation is first performed out of rows belonging to the second imaging region.

16. An imaging system comprising:
the imaging device according to claim 1; and
a signal processing unit that processes signals output from the pixels of the imaging device.

17. The imaging system according to claim 16, wherein the signal processing unit performs a correction process to subtract output values of the pixels arranged in the first reference region from output values of the pixels arranged in the first imaging region and a correction process to subtract output values of the pixels arranged in the second reference region from output values of the pixels arranged in the second imaging region.

18. A movable object comprising:
the imaging device according to claim 1;
a distance information acquisition unit that acquires distance information on a distance to an object, from parallax image based on signals from the imaging device; and
a control unit that controls the movable object based on the distance information.

19. The imaging device according to claim 1, wherein readout operations of the first reference region, the first imaging region, the second reference region, and the second imaging region are performed in this order during a period from a timing that the first reference region is selected to a timing that the first reference region is selected next.

20. The imaging device according to claim 19,
wherein a readout scan of the first imaging region and a readout scan of the first reference region are controlled by a first readout scan start signal, and
wherein a readout scan of the second imaging region and a readout scan of the second reference region are controlled by a second readout scan start signal that is supplied at a timing different from a timing of that the first readout scan start signal is supplied.

21. The method of driving the imaging device according to claim 13, wherein readout operations of the first reference region, the first imaging region, the second reference region, and the second imaging region are performed in this order during a period from a timing that the first reference region is selected to a timing that the first reference region is selected next.

22. The method of driving the imaging device according to claim 13,
wherein a readout scan of the first imaging region and a readout scan of the first reference region are controlled by a first readout scan start signal, and
wherein a readout scan of the second imaging region and a readout scan of the second reference region are controlled by a second readout scan start signal that is supplied at a timing different from a timing of that the first readout scan start signal is supplied.

23. The imaging device according to claim 1, wherein no effective pixels are arranged on the different row.

24. The method of driving the imaging device according to claim 13, wherein no effective pixels are arranged on the different row.

* * * * *